US011824781B2

(12) United States Patent
Zhao et al.

(10) Patent No.: US 11,824,781 B2
(45) Date of Patent: Nov. 21, 2023

(54) METHOD, DEVICE, AND NETWORK SYSTEM FOR LOAD BALANCING

(71) Applicant: Huawei Technologies Co., Ltd., Shenzhen (CN)

(72) Inventors: Yan Zhao, Beijing (CN); Nan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/858,328

(22) Filed: Jul. 6, 2022

(65) Prior Publication Data
US 2022/0337522 A1    Oct. 20, 2022

Related U.S. Application Data

(63) Continuation of application No. PCT/CN2020/119839, filed on Oct. 7, 2020.

(30) Foreign Application Priority Data

Jan. 7, 2020   (CN) .......................... 202010014096.2
Mar. 6, 2020   (CN) .......................... 202010153003.4

(51) Int. Cl.
*H04L 47/125* (2022.01)
*H04L 45/125* (2022.01)
*H04L 49/25* (2022.01)

(52) U.S. Cl.
CPC .......... *H04L 47/125* (2013.01); *H04L 45/125* (2013.01); *H04L 49/25* (2013.01)

(58) Field of Classification Search
CPC ..... H04L 47/125; H04L 45/24; H04L 45/125; H04L 49/25; H04L 49/109; H04L 49/1515; H04L 49/50
See application file for complete search history.

(56) References Cited

U.S. PATENT DOCUMENTS 7,633,940 B1 * 12/2009 Singh ...................... H04L 47/30
370/389
9,871,720 B1 *  1/2018 Tillotson ............... H04L 45/306
10,110,467 B2 * 10/2018 Thyni ................... H04L 45/124
(Continued)

FOREIGN PATENT DOCUMENTS

CN    103297355 A    9/2013
CN    104601485 A    5/2015
(Continued)

*Primary Examiner* — Mohamed A Kamara
(74) *Attorney, Agent, or Firm* — SLATER MATSIL, LLP

(57) ABSTRACT

A method for implementing load balancing are applied to a 4-node network structure. Every two nodes in the 4-node network structure are interconnected, and the nodes are, e.g., dies. The 4-node network structure includes a source node (SN) and a destination node (DN). According to the method, when a bandwidth occupied by ingress traffic flowing into the SN and destined for the DN is greater than a bandwidth of a fabric side link (FSL) between the SN and the DN, the SN selects at least two transmission paths to send the ingress traffic to the DN; and when the bandwidth occupied by the ingress traffic is less than or equal to the bandwidth of the FSL, the SN transmits the ingress traffic on a direct link between the SN and the DN.

19 Claims, 12 Drawing Sheets

(56) References Cited

U.S. PATENT DOCUMENTS

| | | | | |
|---|---|---|---|---|
| 2010/0303086 A1* | 12/2010 | Bialkowski | ............ | H04L 49/45 |
| | | | | 370/400 |
| 2012/0134364 A1 | 5/2012 | Coppola et al. | | |
| 2014/0211630 A1* | 7/2014 | Cavanna | ................ | H04L 47/12 |
| | | | | 370/235 |
| 2021/0014171 A1* | 1/2021 | Amend | ................... | H04L 47/56 |

FOREIGN PATENT DOCUMENTS

| | | |
|---|---|---|
| CN | 106851727 A | 6/2017 |
| CN | 107770083 A | 3/2018 |
| CN | 110417674 A | 11/2019 |

\* cited by examiner

METHOD, DEVICE, AND NETWORK SYSTEM FOR LOAD BALANCING

CROSS-REFERENCE TO RELATED APPLICATIONS

This application is a continuation of International Application No. PCT/CN2020/119839, filed on Oct. 7, 2020, which claims priority to Chinese Patent Application No. 202010014096.2, filed on Jan. 7, 2020, and priority to Chinese Patent Application No. 202010153003.4, filed on Mar. 6, 2020. All of the aforementioned applications are hereby incorporated by reference in their entireties.

TECHNICAL FIELD

This application relates to the field of communication technologies, and in particular, to a method, device, and network system for load balancing.

BACKGROUND

A requirement of an early network for a bandwidth of a single network switching device is low, and generally, one switching device includes only one switching chip. As shown in FIG. 1, only one node is packaged in a chip. The node refers to a basic dicing unit in an entire silicon chip or wafer in a semiconductor process, for example, a die. With development of technologies, a single-device single-chip single-node design gradually cannot meet a rapidly increasing requirement of a network for a fabric bandwidth of a switching device. Therefore, a plurality of designs for improving a switching capability of a device emerge. For example, a plurality of switching devices form a small ring network system, each switching device includes one or two switching chips, and each switching chip includes one or two nodes, to form a multi-node structure. How to ensure better non-blocking switching of traffic in the multi-node structure is a problem that needs to be resolved.

SUMMARY

This application provides a method, device, and network system for load balancing. According to the load balancing manner provided in this application, fabric side link resource costs can be reduced on a basis of implementing non-blocking switching of traffic.

According to a first aspect, this application provides a method for load balancing. The method is applied to a 4-node network structure, and four nodes in the 4-node network structure include a source node and a destination node. When a bandwidth occupied by ingress traffic flowing into the source node and destined for the destination node is greater than a bandwidth of a fabric side link between the source node and the destination node, the source node transmits a first packet in the ingress traffic on a first transmission path, and transmits a second packet in the ingress traffic on a second transmission path, where the first transmission path is a path that directly connects the source node and the destination node, the second transmission path is a path that passes through a first intermediate node and that is from the source node to the destination node, and the first intermediate node belongs to the 4-node network structure. Every two nodes in the 4-node network structure are interconnected. In some cases, the interconnection between every two nodes may include bidirectional interconnection between every two nodes. The ingress traffic flowing into the source node and destined for the destination node is traffic that flows in through a line port of a network device to which the source node belongs and that is destined for the destination node through the source node. The bandwidth of the fabric side link between the source node and the destination node is a bandwidth of a physical link connecting the source node to the destination node.

The source node, the first intermediate node, and the destination node each are a basic dicing unit integrated in a network device. The 4-node network structure (architecture) includes four nodes, and each node is connected to the other three nodes, to form a fully-connected structure between the four nodes. Each node includes a group of line ports, configured to connect to a line port of a network device to which the node belongs. Each node further includes three groups of fabric ports, configured to connect to the other three nodes in the network architecture separately. The four nodes may be evenly or unevenly distributed in a plurality of network devices, or all of the four nodes may be included in one network device. The four nodes each may be specifically packaged in a chip of a corresponding network device. The source node is the $1^{st}$ node through which the traffic flows in the 4-node network structure, and the destination node is the last node through which the traffic flows in the 4-node network structure.

When the bandwidth occupied by the ingress traffic is greater than the bandwidth of the fabric side link between the source node and the destination node, it indicates that the traffic needs to occupy a large quantity of link bandwidth resources, and the direct fabric side link between the source node and the destination node cannot meet an actual requirement. In this case, at least another link may be additionally used to complete forwarding of the traffic from the source node to the destination node, to implement non-blocking switching of the traffic. Because traffic is allowed to be transmitted on at least two fabric side links, instead of being forwarded only on a direct fabric side link between nodes, a fabric speedup (where the fabric speedup is less than 3) of a node can be reduced to some extent, to save network resources. It should be noted that traffic in the 4-node network structure includes one or more packets. The one or more packets flow into the 4-node network structure from a same node for the first time, and flow out of the 4-node network structure from a same node. The 1st node into which the one or more packets flow is a source node of the traffic in the 4-node network structure. The node from which the one or more packets flow out is a destination node of the traffic in the 4-node network structure. The one or more packets forming the traffic may flow in through one or more line ports of the source node, and a total bandwidth that corresponds to all line ports and that is occupied when the one or more packets flow into the source node is a total line bandwidth occupied by the traffic. The traffic may be referred to as ingress traffic flowing into the source node and destined for the destination node. When a source node and a destination node of a piece of traffic are different, a bandwidth of a fabric side link between the source node and the destination node of the traffic is a bandwidth of a direct link from the source node to the destination node. It should be further noted that specific packets included in a piece of traffic may be determined based on an actual scenario or application requirement. For example, in a case, all packets that flow from a same source node to a same destination node in a period of time may form one piece of traffic. In another case, all packets that belong to a same service and that flow from a same source node to a same destination node may form one piece of traffic. In another case, all packets that flow from one or more ports specified by a same source node to a same destination node form one piece of traffic (where in the two cases in which traffic composition is determined based on a service or a port, the mentioned "all packets" may be a relative concept, for example, all packets in a specified period of time). In other cases, other rules may alternatively be set to determine specific composition of traffic sent from a source node to a destination node.

In a possible implementation, the ingress traffic further includes a third packet. When the bandwidth occupied by the ingress traffic is greater than the bandwidth of the fabric side link between the source node and the destination node, the source node further transmits the third packet on a third transmission path, where the third transmission path is a link that passes through a second intermediate node and that is from the source node to the destination node, and the second intermediate node belongs to the 4-node network structure. When the bandwidth occupied by the ingress traffic is greater than the bandwidth of the fabric side link between the source node and the destination node, the source node may complete forwarding of a piece of traffic on the direct link between the source node and the destination node and two other links that each bypass an intermediate node together. This can ensure that a fabric speedup of a node is reduced on a basis of implementing non-blocking switching of traffic, to save network resources.

In a possible implementation, the ingress traffic includes first traffic and second traffic, the first traffic includes the first packet, and the second traffic includes the second packet. The source node transmits the first traffic on the first transmission path, where a volume of the first traffic is the bandwidth of the fabric side link between the source node and the destination node. The source node transmits the second traffic on the second transmission path, where a volume of the second traffic is a difference between the bandwidth occupied by the ingress traffic and the bandwidth of the fabric side link between the source node and the second node.

In a possible implementation, the ingress traffic includes first traffic, second traffic, and third traffic, the first traffic includes the first packet, the second traffic includes the second packet, and the third traffic includes the third packet. The source node transmits the first traffic on the first transmission path, where a volume of the first traffic is the bandwidth of the fabric side link between the source node and the destination node. The source node transmits the second traffic on the second transmission path, where a volume of the second traffic is a first difference, and the first difference is a part of a difference between the bandwidth occupied by the ingress traffic and the bandwidth of the fabric side link between the source node and the destination node. The source node transmits the third traffic on the third transmission path, where a volume of the third traffic is a second difference, and the second difference is the other part of the difference between the bandwidth occupied by the ingress traffic and the bandwidth of the fabric side link between the source node and the destination node. In a case, the first difference is equal to the second difference. In another case, allocation proportions of the first difference and the second difference are determined according to an actual situation (for example, a service type difference or a link bandwidth difference). The first traffic, the second traffic, or the third traffic may be continuous or may be discontinuous, provided that the volume of the traffic finally transmitted on the corresponding transmission path meets a specified value or proportion. Assuming that a line bandwidth of the source node is one unit, a fabric bandwidth between the source node and any other node requires at least 0.5 unit, that is, the source node only requires 1.5 times the fabric speedup to support non-blocking switching of line traffic at the source node.

In a possible implementation, when the bandwidth occupied by the ingress traffic is less than or equal to the bandwidth of the fabric side link between the source node and the destination node, if there are two transmission paths that can be used to forward the ingress traffic between the nodes, the source node transmits the first packet and the second packet on the first transmission path; or if there are three transmission paths that can be used to forward the ingress traffic between the nodes, the source node transmits the first packet, the second packet, and the third packet on the first transmission path. In this way, when the bandwidth occupied by the ingress traffic is less than or equal to the bandwidth of the fabric side link between the source node and the destination node, it indicates that non-blocking switching of the traffic can be implemented only on the direct fabric side link between the source node and the destination node. In this case, all packets (that is, the entire ingress traffic) included in the entire traffic may be sent on the direct fabric side link, to ensure a low-delay requirement for traffic forwarding.

In a possible implementation, the source node encapsulates indication information used to indicate the first transmission path into the first packet, and encapsulates indication information used to indicate the second transmission path into the second packet. Therefore, a node that receives a corresponding packet can determine, based on the indication information, a next hop for transmitting the packet, or determine that the node is a destination node of the packet. When the node determines, based on the indication information, that the packet further needs to be forwarded to the next hop, the node may update the indication information (where for example, when the indication information is a label stack, a stack top label may pop up, and an updated stack top label becomes a label of the next-hop node), and may forward the packet through a fabric port of the node. When the node determines, based on the indication information, that the node itself is the destination node of the packet, the node may send, through a line port of the node, the packet to a line port of a network device to which the node belongs, so that the network device processes the packet.

According to a second aspect, this application provides a network device for load balancing. The network device includes a transceiver and a first node, where the transceiver is configured to receive ingress traffic and send the received ingress traffic to the first node, the first node and a second node belong to a same 4-node network structure, the first node is a source node, and the second node is a destination node.

When a bandwidth occupied by ingress traffic flowing into the first node and destined for the second node is greater than a bandwidth of a fabric side link between the first node and the second node, the first node is configured to transmit a first packet in the ingress traffic on a first transmission path, and transmit a second packet in the ingress traffic on a second transmission path, where the first transmission path is a path that directly connects the first node and the second node, the second transmission path is a path that passes through a first intermediate node and that is from the first node to the second node, and the first intermediate node belongs to the 4-node network structure. For the 4-node network structure, refer to related descriptions in the first aspect. Details are not described herein again.

In a possible case, the second node also belongs to the network device. In another possible case, the first intermediate node and/or the second intermediate node also belong/belongs to the network device. In an actual application scenario, the network device may be a network switching device, for example, a network device having a packet forwarding function, such as a router or a switch, and the first node is a basic dicing unit integrated in the network device. For example, the first node and the second node may be specifically located on a switching chip, and the first node and the second node may be located on a same switching chip, or may be located on different switching chips. The network device may alternatively be a switching board in a device. The switching board includes, for example, a switching chip, and the first node may be located on the switching chip. Because the network device allows traffic to be transmitted on at least two fabric side links between nodes, instead of being forwarded only on a direct fabric side link between the nodes, a fabric speedup (where the fabric speedup is less than 3) of a node can be reduced to some extent, to save network resources.

In a possible implementation, the ingress traffic further includes a third packet. When the bandwidth occupied by the ingress traffic is greater than the bandwidth of the fabric side link between the first node and the second node, the first node further transmits the third packet on a third transmission path, where the third transmission path is a path that passes through a second intermediate node and that is from the first node to the second node, and the second intermediate node belongs to the 4-node network structure.

In a possible implementation, the ingress traffic includes first traffic and second traffic, the first traffic includes the first packet, and the second traffic includes the second packet. The first node transmits the first traffic on the first transmission path, where a volume of the first traffic is the bandwidth of the fabric side link between the first node and the second node. The first node transmits the second traffic on the second transmission path, where a volume of the second traffic is a difference between the bandwidth occupied by the ingress traffic and the bandwidth of the fabric side link between the first node and the second node.

In a possible implementation, the ingress traffic includes first traffic, second traffic, and third traffic, the first traffic includes the first packet, the second traffic includes the second packet, and the third traffic includes the third packet. The first node transmits the first traffic on the first transmission path, where a volume of the first traffic is the bandwidth of the fabric side link between the first node and the second node. The first node transmits the second traffic on the second transmission path, where a volume of the second traffic is a first difference, and the first difference is a part of a difference between the bandwidth occupied by the ingress traffic and the bandwidth of the fabric side link between the first node and the second node. The first node transmits the third traffic on the third transmission path, where a volume of the third traffic is a second difference, and the second difference is the other part of the difference between the bandwidth occupied by the ingress traffic and the bandwidth of the fabric side link between the first node and the second node. In a possible case, the first difference is equal to the second difference. In another possible case, the first difference may not be equal to the second difference.

In a possible implementation, when the bandwidth occupied by the ingress traffic is less than or equal to the bandwidth of the fabric side link between the first node and the second node, the first node transmits the ingress traffic on the first transmission path.

In a possible implementation, the first node encapsulates indication information used to indicate the first transmission path into the first packet, and encapsulates indication information used to indicate the second transmission path into the second packet.

According to a third aspect, this application provides a network device for load balancing, where the network device includes a receiving unit and a sending unit. The receiving unit is configured to receive, from a source node, ingress traffic destined for a destination node, where the source node and the destination node belong to a same 4-node network structure. When a bandwidth occupied by the ingress traffic is greater than a bandwidth of a fabric side link between the source node and the destination node, the sending unit is configured to transmit a first packet in the ingress traffic from the source node on a first transmission path, and transmit a second packet in the ingress traffic from the source node on a second transmission path, where the first transmission path is a path that directly connects the source node and the destination node, the second transmission path is a path that passes through a first intermediate node and that is from the source node to the destination node, and the first intermediate node belongs to the 4-node network structure. That the receiving unit is configured to receive, from the source node, the ingress traffic destined for the destination node may be specifically: The receiving unit receives the ingress traffic through a line port of the source node. That the sending unit transmits the first packet or the second packet from the source node may be specifically: The sending unit transmits the first packet or the second packet through a fabric port of the source node. The ingress traffic received at the source node and destined for the destination node is traffic that flows in through the line port of the source node and destined for the destination node through the fabric port of the source node.

In a possible implementation, the ingress traffic further includes a third packet. When the bandwidth occupied by the ingress traffic is greater than the bandwidth of the fabric side link between the source node and the destination node, the sending unit further transmits the third packet on a third transmission path at the source node, where the third transmission path is a path that passes through a second intermediate node and that is from the source node to the destination node, and the second intermediate node belongs to the 4-node network structure.

In a possible implementation, the ingress traffic includes first traffic and second traffic, the first traffic includes the first packet, and the second traffic includes the second packet. The first node transmits the first traffic on the first transmission path, where a volume of the first traffic is the bandwidth of the fabric side link between the first node and the second node. The first node transmits the second traffic on the second transmission path, where a volume of the second traffic is a difference between the bandwidth occupied by the ingress traffic and the bandwidth of the fabric side link between the first node and the second node.

In a possible implementation, the ingress traffic includes first traffic, second traffic, and third traffic, the first traffic includes the first packet, the second traffic includes the second packet, and the third traffic includes the third packet. The first node transmits the first traffic on the first transmission path, where a volume of the first traffic is the bandwidth of the fabric side link between the first node and the second node. The first node transmits the second traffic on the second transmission path, where a volume of the second traffic is a first difference, and the first difference is a part of a difference between the bandwidth occupied by the ingress traffic and the bandwidth of the fabric side link between the first node and the second node. The first node transmits the third traffic on the third transmission path, where a volume of the third traffic is a second difference, and the second difference is the other part of the difference between the bandwidth occupied by the ingress traffic and the bandwidth of the fabric side link between the first node and the second node. In a possible case, the first difference is equal to the second difference. In another possible case, the first difference may not be equal to the second difference.

In a possible implementation, when the bandwidth occupied by the ingress traffic is less than or equal to the bandwidth of the fabric side link between the source node and the destination node, the first sending unit transmits the ingress traffic from the source node on the first transmission path.

In a possible implementation, the network device further includes a processing unit. The processing unit is configured to encapsulate, at the source node, indication information indicating the first transmission path into the first packet, and encapsulate, at the source node, indication information indicating the second transmission path into the second packet.

According to a fourth aspect, this application provides a chip. The chip includes a first node, the first node and a second node belong to a same 4-node network structure, the first node is a source node, and the second node is a destination node. When a bandwidth occupied by ingress traffic flowing into the first node and destined for the second node is greater than a bandwidth of a fabric side link between the first node and the second node, the first node transmits a first packet on a first transmission path, and transmits a second packet on a second transmission path, where the first transmission path is a path that directly connects the source node and the destination node, the second transmission path is a path that passes through a first intermediate node and that is from the source node to the destination node, and the first intermediate node belongs to the 4-node network structure.

In a possible implementation, when the bandwidth occupied by the ingress traffic is greater than the bandwidth of the fabric side link between the first node and the second node, the first node further transmits a third packet on a third transmission path, where the third transmission path is a path that passes through a second intermediate node and that is from the first node to the second node, and the second intermediate node belongs to the 4-node network structure.

It should be noted that the second node and the first intermediate node and/or the second intermediate node may or may not belong to the chip. That is, the four nodes that form the 4-node network structure may belong to a same chip, or may belong to a plurality of different chips. When the four nodes belong to a same chip, the chip may belong to one network device (for example, a router, a switch, or a switching board). When the four nodes belong to a plurality of different chips, the plurality of chips may be located in one network device, or may be located in a plurality of (that is, two or more) network devices. Because the chip allows traffic to be transmitted on at least two fabric side links between nodes, instead of being forwarded only on a direct fabric side link between the nodes, a fabric speedup of a node can be reduced to some extent, to save network resources.

In a possible implementation, when the bandwidth occupied by the ingress traffic is less than or equal to the bandwidth of the fabric side link between the first node and the second node, the first node transmits the first packet, the second packet, and the third packet on the first transmission path.

In a possible implementation, the ingress traffic includes first traffic and second traffic, the first traffic includes the first packet, and the second traffic includes the second packet. The first node transmits the first traffic on the first transmission path, where a volume of the first traffic is the bandwidth of the fabric side link between the first node and the second node. The first node transmits the second traffic on the second transmission path, where a volume of the second traffic is a difference between the bandwidth occupied by the ingress traffic and the bandwidth of the fabric side link between the first node and the second node.

In a possible implementation, the ingress traffic includes first traffic, second traffic, and third traffic, the first traffic includes the first packet, the second traffic includes the second packet, and the third traffic includes the third packet. The first node transmits the first traffic on the first transmission path, where a volume of the first traffic is the bandwidth of the fabric side link between the first node and the second node. The first node transmits the second traffic on the second transmission path, where a volume of the second traffic is a first difference, and the first difference is a part of a difference between the bandwidth occupied by the ingress traffic and the bandwidth of the fabric side link between the first node and the second node. The first node transmits the third traffic on the third transmission path, where a volume of the third traffic is a second difference, and the second difference is the other part of the difference between the bandwidth occupied by the ingress traffic and the bandwidth of the fabric side link between the first node and the second node. In a possible case, the first difference is equal to the second difference. In another possible case, the first difference may not be equal to the second difference.

In a possible implementation, the first node encapsulates indication information used to indicate the first transmission path into the first packet, and encapsulates indication information used to indicate the second transmission path into the second packet.

In a possible implementation, when the chip further includes the second node, the chip further receives the first packet and the second packet through the second node, and processes the first packet and the second packet based on the indication information in the first packet and the indication information in the second packet, where the processing may be, for example, storing data in the packet, or continuing to forward the data in the packet. When the chip further includes the first intermediate node and/or the second intermediate node, the chip further receives the first packet and the second packet through the first intermediate node and/or the second intermediate node, and updates the indication information in the first packet and the indication information in the second packet through the first intermediate node and/or the second intermediate node. The update operation may be, for example, popping up a label identifying the first intermediate node and/or the second intermediate node, where the label may be encapsulated in, for example, a packet header of the packet.

According to a fifth aspect, this application provides a circuit. The circuit is configured to implement a function of a source node, the source node is configured to transmit ingress traffic flowing in from the source node and destined for a destination node, and the source node and the destination node belong to the 4-node network structure. The circuit includes a first port, a second port, and a third port. The first port may be a line port, and is configured to connect to a line port of a device to which the circuit belongs. The second port and the third port may be fabric ports, and are configured to connect to the destination node and a first intermediate node respectively, where the first intermediate node also belongs to the 4-node network structure. The first port is configured to receive the ingress traffic. When a bandwidth occupied by the ingress traffic flowing into the source node is greater than a bandwidth of a fabric side link between the source node and the destination node, the second port is configured to transmit a first packet in the ingress traffic on a first transmission path, and the third port is configured to transmit a second packet in the ingress traffic from the source node on a second transmission path. The first transmission path is a path that directly connects the source node and the destination node, and the second transmission path is a path that passes through the first intermediate node and that is from the source node to the destination node.

In a possible implementation, the circuit further includes a fourth port, where the fourth port may be a fabric port and is configured to connect to a second intermediate node, and the second intermediate node also belongs to the 4-node network structure. The traffic further includes a third packet. When the bandwidth occupied by the ingress traffic is greater than the bandwidth of the fabric side link between the source node and the destination node, the fourth port further transmits the third packet from the source node on a third transmission path, where the third transmission path is a path that passes through the second intermediate node and that is from the source node to the destination node.

In a possible implementation, the ingress traffic includes first traffic and second traffic, the first traffic includes the first packet, and the second traffic includes the second packet. The first node transmits the first traffic on the first transmission path, where a volume of the first traffic is the bandwidth of the fabric side link between the first node and the second node. The first node transmits the second traffic on the second transmission path, where a volume of the second traffic is a difference between the bandwidth occupied by the ingress traffic and the bandwidth of the fabric side link between the first node and the second node.

In a possible implementation, the ingress traffic includes first traffic, second traffic, and third traffic, the first traffic includes the first packet, the second traffic includes the second packet, and the third traffic includes the third packet. The first node transmits the first traffic on the first transmission path, where a volume of the first traffic is the bandwidth of the fabric side link between the first node and the second node. The first node transmits the second traffic on the second transmission path, where a volume of the second traffic is a first difference, and the first difference is a part of a difference between the bandwidth occupied by the ingress traffic and the bandwidth of the fabric side link between the first node and the second node. The first node transmits the third traffic on the third transmission path, where a volume of the third traffic is a second difference, and the second difference is the other part of the difference between the bandwidth occupied by the ingress traffic and the bandwidth of the fabric side link between the first node and the second node. In a possible case, the first difference is equal to the second difference. In another possible case, the first difference may not be equal to the second difference.

In a possible implementation, when the bandwidth occupied by the ingress traffic is less than or equal to the bandwidth of the fabric side link between the source node and the destination node, the circuit transmits the ingress traffic on the first transmission path through the second port.

In a possible implementation, the circuit further includes a processing logic subcircuit. The processing logic subcircuit is configured to encapsulate indication information indicating the first transmission path into the first packet, and encapsulate indication information indicating the second transmission path into the second packet.

According to a sixth aspect, this application provides a network system for load balancing, where the network system includes a first network device and a second network device. The first network device includes a source node, the second network device includes a destination node, and the source node and the destination node belong to a same 4-node network structure.

The first network device is configured to: when a bandwidth occupied by ingress traffic flowing into the source node and destined for the destination node is greater than a bandwidth of a fabric side link between the source node and the destination node, transmit a first packet in the ingress traffic on a first transmission path determined by the source node, and transmit a second packet in the ingress traffic on a second transmission path determined by the source node, where the first transmission path is a path that directly connects the source node and the destination node, the second transmission path is a path that passes through a first intermediate node and that is from the source node to the destination node, and the first intermediate node belongs to the 4-node network structure. The second network device is configured to receive the first packet and the second packet through the destination node.

In a possible implementation, the ingress traffic further includes a third packet. When the bandwidth occupied by the ingress traffic is greater than the bandwidth of the fabric side link between the source node and the destination node, the first network device further transmits the third packet on a third transmission path determined by the source node, where the third transmission path is a path that passes through a second intermediate node and that is from the source node to the destination node, and the second intermediate node belongs to the 4-node network structure. It should be noted that the first intermediate node or the second intermediate node may be located in the first network device, may be located in the second network device, or may be located in another network device.

In a possible implementation, when the bandwidth occupied by the ingress traffic is less than or equal to the bandwidth of the fabric side link between the source node and the destination node, the first network device transmits the ingress traffic on the first transmission path determined by the source node.

In a possible implementation, the ingress traffic includes first traffic and second traffic, the first traffic includes the first packet, and the second traffic includes the second packet. The first node transmits the first traffic on the first transmission path, where a volume of the first traffic is the bandwidth of the fabric side link between the first node and the second node. The first node transmits the second traffic on the second transmission path, where a volume of the second traffic is a difference between the bandwidth occupied by the ingress traffic and the bandwidth of the fabric side link between the first node and the second node.

In a possible implementation, the ingress traffic includes first traffic, second traffic, and third traffic, the first traffic includes the first packet, the second traffic includes the second packet, and the third traffic includes the third packet. The first network device transmits the first traffic from the source node on the first transmission path, where a volume of the first traffic is the bandwidth of the fabric side link between the first node and the second node. The first network device transmits the second traffic from the source node on the second transmission path, where a volume of the second traffic is a first difference, and the first difference is a part of a difference between the bandwidth occupied by the ingress traffic and the bandwidth of the fabric side link between the first node and the second node. The first network device transmits the third traffic from the source node on the third transmission path, where a volume of the third traffic is a second difference, and the second difference is the other part of the difference between the bandwidth occupied by the ingress traffic and the bandwidth of the fabric side link between the first node and the second node. In a possible case, the first difference is equal to the second difference. In another possible case, the first difference may not be equal to the second difference.

In a possible implementation, the first network device is further configured to encapsulate, through the source node, indication information used to indicate the first transmission path into the first packet, and encapsulate, through the source node, indication information used to indicate the second transmission path into the second packet.

In a possible implementation, the second network device processes the first packet and the second packet based on the indication information in the first packet and the indication information in the second packet respectively.

DETAILED DESCRIPTION OF ILLUSTRATIVE EMBODIMENTS

Embodiments of this application provide a method, device, and network system for load balancing, to implement non-blocking switching of traffic while saving network resources.

Figure 1:
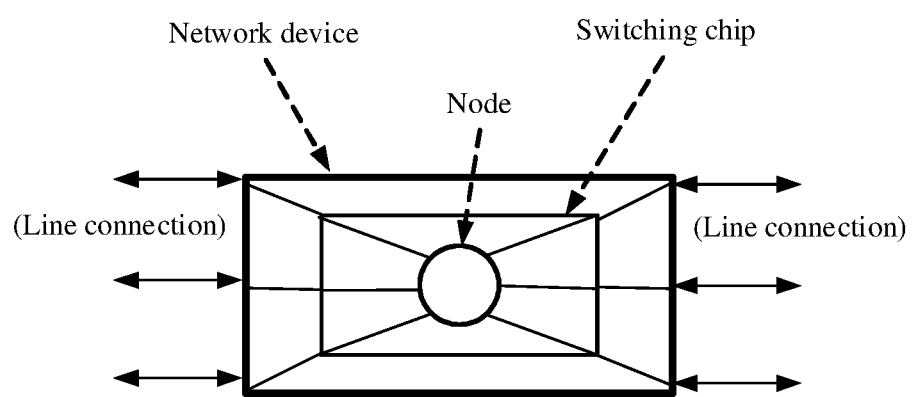
FIG. 1 is a schematic diagram of a structure of a node according to an embodiment of this application.

With a surge in a network data volume, a switching capability of a network device such as a network switching device needs to be continuously improved. A switching capability of a network device is related to a quantity of nodes that have a data exchange capability in the network device. It should be noted that a node mentioned in embodiments of this application represents a basic dicing unit in an entire silicon chip or wafer in a semiconductor technology, for example, a die. A node may be packaged in a switching chip in a network device, as shown in FIG. 1. A larger quantity of nodes included in the network device indicates a stronger switching capability that can be provided by the network device. When the network device includes a plurality of nodes, each network device may include a plurality of switching chips, and each switching chip may include one or more nodes.

Figure 2A:
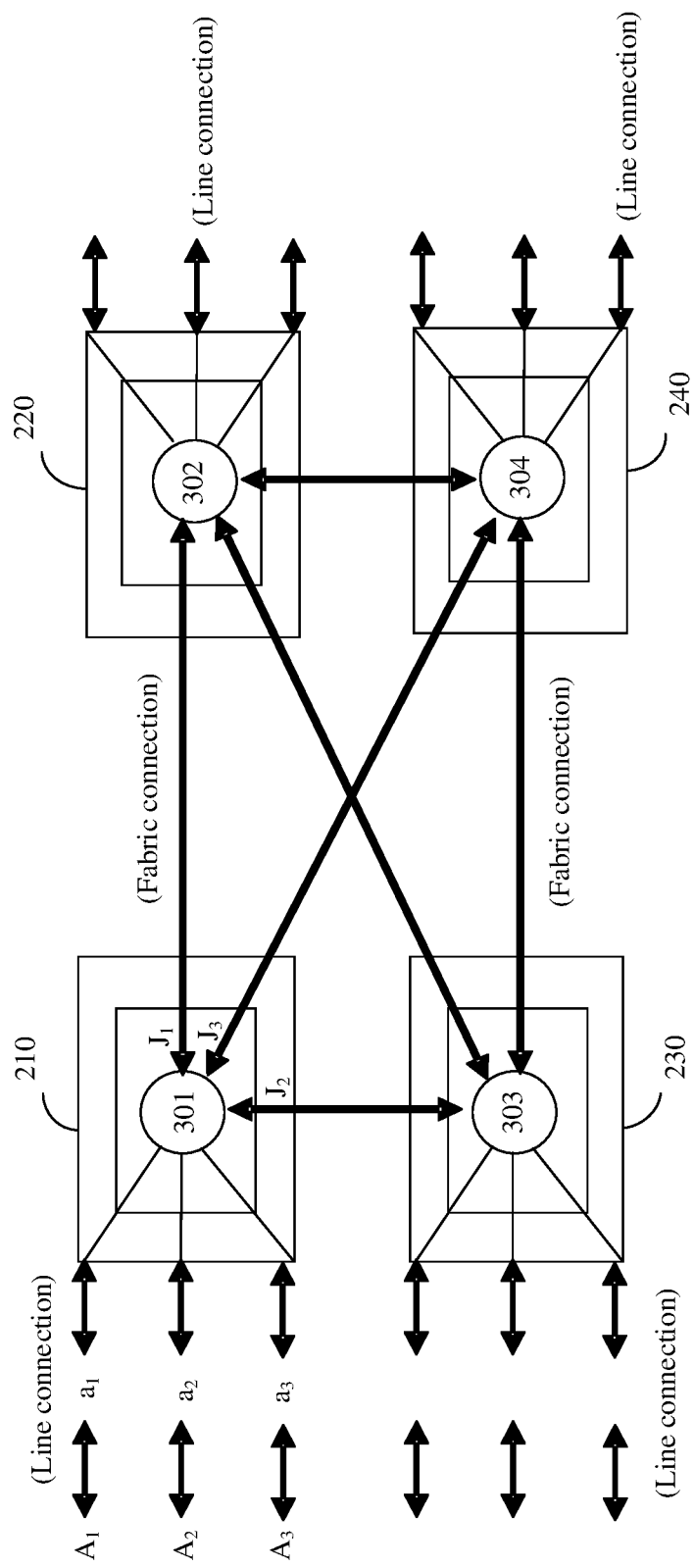
FIG. 2a is a schematic diagram of a structure of a network system according to an embodiment of this application.
Figure 2B:
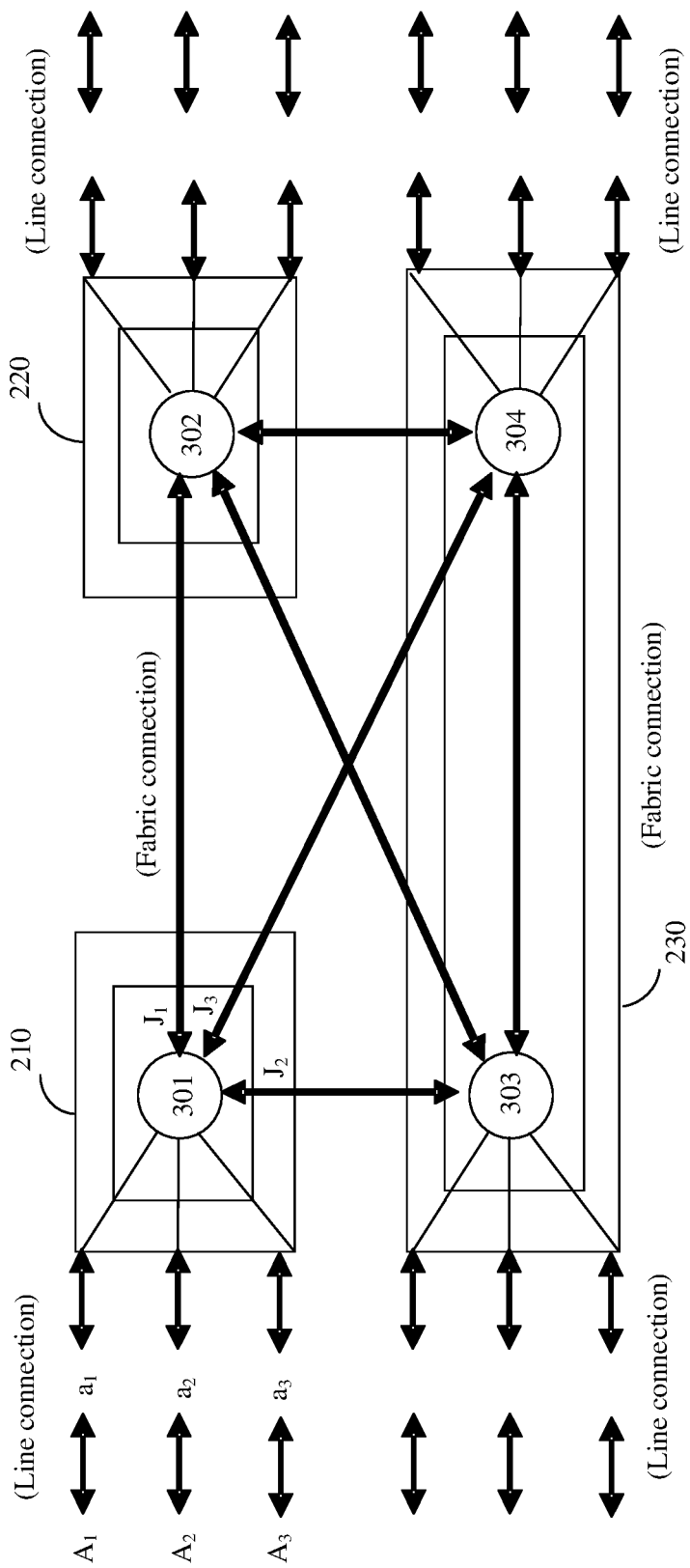
FIG. 2b is a schematic diagram of a structure of another network system according to an embodiment of this application.

In an application scenario, a network system usually includes a plurality of network devices, and the network device may include one or more nodes. For example, as shown in FIG. 2a, a network system 200 may include four network devices shown in FIG. 1: network devices 210 to 240. The network system 200 may be used as one network device to implement data exchange. Each of the network devices 210 to 240 in the network system 200 includes one switching chip, and each switching chip includes one node. In some other application scenarios, the four nodes 301 to 304 may alternatively be distributed in another manner. For example, as shown in FIG. 2b, the four nodes 301 to 304 may alternatively be distributed in the three network devices 210 to 230 in the network system 200. The network device 210 includes the node 301, the network device 220 includes the node 302, and the network device 230 includes the node 303 and the node 304. That is, the four nodes 301 to 304 may be evenly or unevenly distributed in a plurality of network devices, or all of the four nodes may be included in one network device. Regardless of which specific distribution manner is used, when every two the four nodes 301 to 304 can be connected to each other on a fabric side link between the nodes, the four nodes 301 to 304 jointly form a 4-node network architecture. In a specific case, every two of the four nodes 301 to 304 are bidirectionally connected.

Figure 3:
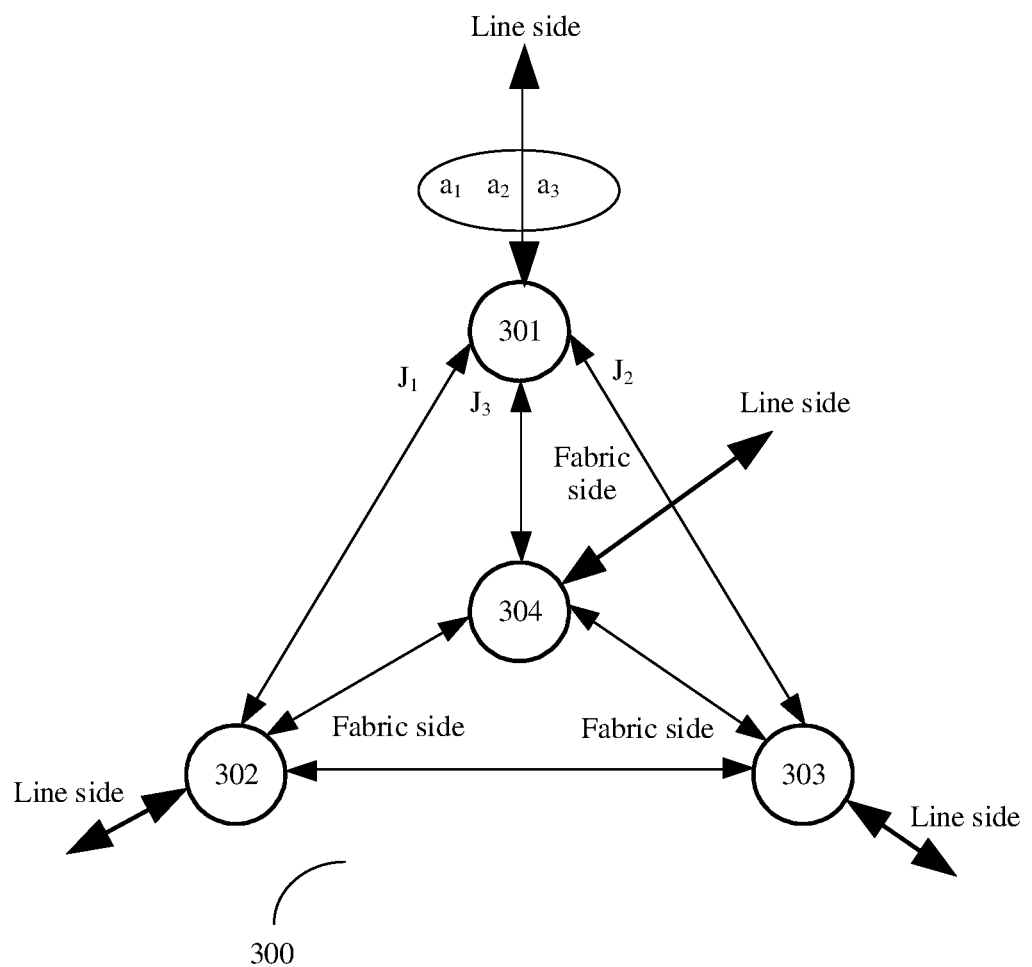
FIG. 3 is a schematic diagram of a 4-node network architecture according to an embodiment of this application.

FIG. 3 is a schematic diagram of a 4-node network architecture 300. The architecture may be applied to one network device, or may be applied to a network system including a plurality of network devices. The 4-node network architecture 300 includes a node 301, a node 302, a node 303, and a node 304, and each node is connected to the other three nodes, to form a fully-connected structure between the four nodes. The node 301, the node 302, the node 303, and the node 304 each include one group of line ports, configured to connect to a line port of a network device to which the node 301, the node 302, the node 303, and the node 304 each belong. The node 301, the node 302, the node 303, and the node 304 each further include three groups of fabric ports, configured to separately connect to the other three nodes in the network architecture. For example, the node 301 includes fabric ports J1, J2, and J3, where the fabric port J1 is configured to connect to the node 302, the fabric port J2 is configured to connect to the node 303, and the fabric port J3 is configured to connect to the node 304. The node 301 further includes line ports a1, a2, and a3, configured to respectively connect to line ports A1, A2, and A3 of a network device to which the node 301 belongs. It should be noted that, during actual application, any quantity of line ports of each node may be set to as required, and the line ports of each node are separately connected to line ports on a network device correspondingly. In a case, a piece of traffic (or one or more packets forming the traffic) may flow from a network device into a node in a 4-node network architecture through one line port of the node. In another case, a piece of traffic may flow from a network device into a node in a 4-node network architecture through a plurality of line ports of the node.

A transmission path of a packet (or traffic including a group of packets) in a multi-node network may be a path formed by nodes through which the packet passes in a process from entering a source network device to leaving a destination network device by the packet. The source network device includes the $1^{st}$ node that the packet passes through on the transmission path, and the destination network device includes the last node that the packet passes through on the transmission path. It should be noted that in some cases, for example, when a plurality of nodes are located in a same network device, the source network device and the destination network device are a same network device. A node that receives the packet from a line port of the source network device is referred to as a source node of the packet. A node that sends the packet to a line port of the destination network device is referred to as a destination node of the packet. If the packet further passes through one or more other nodes in a process in which the packet is sent from the source node to the destination node, the one or more other nodes are referred to as intermediate nodes. When being transmitted, a group of packets that belong to a same piece of traffic pass through a same source node and a same destination node but may pass through one or more transmission paths. The one or more different transmission paths may pass through zero intermediate nodes, one intermediate node, or a plurality of intermediate nodes. In the 4-node network architecture 300 shown in FIG. 3, a group of packets belonging to a same piece of traffic may pass through zero intermediate nodes, one intermediate node, or two intermediate nodes based on different selected transmission paths. For example, the source node is 301 and the destination node is 304. Optional transmission paths include at least 301→304, 301→302→304, and 301→302→303→304. The foregoing enumerated transmission paths are merely used as examples to describe transmission paths that are with different quantities of intermediate nodes and that may be selected in a process of sending the traffic from 301 to 304. Actually, more possible transmission paths may be further included, for example, 301→303→304. It may be understood that, in the 4-node network architecture, the source node is the $1^{st}$ node through which the traffic flows in the 4-node network structure, and the destination node is the last node through which the traffic flows in the 4-node network structure. It should be noted that the source node, the destination node, and the intermediate node are relative. For example, a node is a source node for one piece of traffic, and may be a destination node or an intermediate node for another piece of traffic.

For traffic flowing into a multi-node network, a shortest path first algorithm may be used to implement fast forwarding of the traffic, that is, the traffic is evenly sent on one or more shortest paths from a source node to a destination node. FIG. 3 is still used as an example. For a 4-node network satisfying the network architecture, because the four nodes are in a full-mesh structure, if the shortest path first algorithm is used to implement load balancing, a transmission path of traffic (that is, a group of packets) sent from the source node 301 to the destination node 302 is 301→302, a transmission path of traffic sent from the source node 301 to the destination node 303 is 301→303, and a transmission path of traffic sent from the source node 301 to the destination node 304 is 301→304. That is, the source node 301 selects a fabric side link directly connecting the source node and the destination node to send the traffic to the destination node. Similarly, when another source node sends traffic to a destination node, a direct link between the source node and the destination node is also selected as a transmission path. In the 4-node network architecture, a delay of only one hop of link is required by using the shortest path first algorithm, so that a delay of traffic is low. However, to implement non-blocking switching of traffic between any two nodes, a sufficient bandwidth of a fabric side link between any two nodes needs to be ensured. Therefore, high interconnection costs on a fabric side need to be paid.

When a network architecture is specifically designed, in addition to a switching capability of a network device (or a node) in the network architecture, other indicators generally need to be considered, for example, a fabric speedup and a delay of each node in the network architecture during non-blocking switching. The following first describes two concepts:

1. Non-blocking switching: A condition that a network architecture satisfies non-blocking switching may include: In the network architecture, if traffic input from a line ingress of each node is less than or equal to a bandwidth of the line ingress of the node, and output traffic destined for a line egress of each node is less than or equal to a bandwidth of the line egress of the node, the traffic is not blocked in the network architecture.

2. Fabric speedup of a node: Fabric speedup of a node=Total fabric bandwidth of the node/Total line bandwidth of the node. The total line bandwidth is a total bandwidth corresponding to a line port of a node. When the node has one line port, the total line bandwidth is a bandwidth corresponding to the line port of the node. When the node has a plurality of line ports, the total line bandwidth is a sum of bandwidths separately corresponding to the plurality of line ports of the node. Similarly, the total fabric bandwidth is a bandwidth (or a sum of bandwidths) corresponding to one fabric port (or more fabric ports) of a node. The node 301 shown in FIG. 3 is used as an example. Fabric speedup of the node 301=(Bandwidth of a link between the node 301 and the node 302+Bandwidth of a link between the node 301 and the node 303+Bandwidth of a link between the node 301 and the node 304)/Total line bandwidth of the node 301. A smaller fabric speedup indicates that multi-node non-blocking switching can be implemented by designing a smaller link bandwidth for the network architecture. The node 301 is still used as an example. When load balancing is performed based on the shortest path first algorithm, a bandwidth of a fabric side link between the node 301 and each of the other three nodes (for example, a bandwidth of a fabric side link between 301 and 302) needs to be not less than a total line bandwidth of the node 301, to ensure non-blocking switching of the node 301 in the 4-node network architecture. Therefore, a fabric speedup of the node 301 is at least (1.0+1.0+1.0)/1.0=3.0.

It can be learned that, in the 4-node network architecture, if the shortest path first algorithm is used to transmit traffic, a network transmission delay is low because the traffic can reach a destination node through a single hop. However, because a fabric speedup of a node required by the network architecture is high (3.0), overall costs of implementing non-blocking traffic transmission in the network architecture are high. Embodiments of this application provide a method for load balancing, to ensure a low fabric speedup while implementing a low delay of traffic as much as possible, thereby properly balancing a switching capability and a link bandwidth, and better meeting an overall requirement of a network architecture design.

Figure 4A:
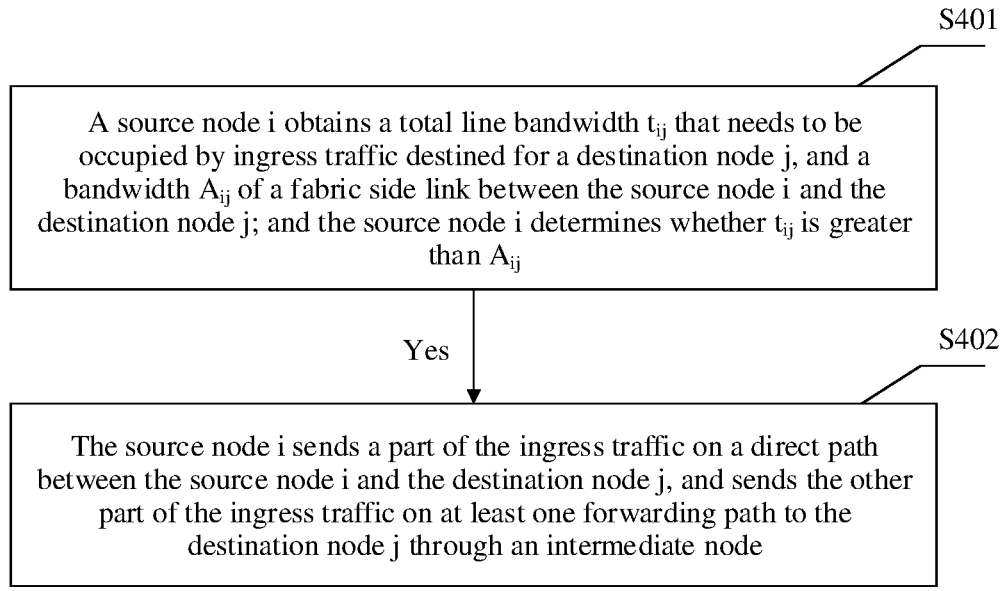
FIG. 4a is a schematic diagram of a method for load balancing according to an embodiment of this application.

An embodiment of this application provides a method for load balancing, applied to a 4-node network architecture. The 4-node network architecture 300 shown in FIG. 3 is still used as an example. It is assumed that the node 301 receives traffic L from a corresponding line port a1, and the traffic L needs to flow out from a line port b corresponding to the node 302. That is, for the traffic L, the node 301 is a source node, and the node 302 is a destination node. It is assumed that a line bandwidth of the source node 301 is 1.0. The bandwidth 1.0 similarly means that a bandwidth of any specified capacity is considered as one unit bandwidth, to facilitate subsequent calculation of traffic allocation and evaluation of indicators such as a fabric speedup. Specifically, for example, one unit bandwidth may be considered as 400 Gbps (where Gbps is a fabric bandwidth unit, and 1 Gbps represents 1000 megabits per second), 800 Gbps, or 12.8 Tbps (where Tbps is a fabric bandwidth unit, and 1 Tbps=1024 Gbps). In addition to the source node 301, line bandwidths of the other nodes 302, 303, and 304 in the architecture 300 are also 1.0. It is assumed that a total line bandwidth occupied when the traffic L flows into the source node 301 is a301302 (briefly referred to as a12 below). a12 may also be referred to as a traffic bandwidth, that is, a bandwidth occupied by ingress traffic flowing into the source node 301 and the destination node 302. When the line bandwidth of the source node 301 is 1.0, the traffic bandwidth a12 may be less than or equal to 1.0. It is assumed that a bandwidth of a fabric side link between every two nodes i and j (i≠j) is Aij, where the bandwidth of the fabric side link herein is a bandwidth of a physical link connecting the node i to the node j, and may also be referred to as a no-load bandwidth. When a fabric side link between two nodes is a bidirectional link, $A_{ij}=A_{ji}$. However, it may be understood that in other cases, bandwidths of links between the two nodes i and j and in different directions may alternatively be different, that is, $A_{ij} \ast A_{ji}$. Line bandwidths of the nodes may be equal, or may not be equal, and may be correspondingly designed based on a specific requirement of a network device. As shown in FIG. 4a, the method for load balancing includes the following steps.

S401. A source node i obtains a total line bandwidth $t_{ij}$ that needs to be occupied by ingress traffic destined for a destination node j, and a bandwidth $A_{ij}$ of a fabric side link between the source node i and the destination node j. The source node 301 determines whether $t_{ij}$ is greater than $A_{ij}$, and if yes, performs S402.

For example, the traffic L flows in from the source node 301 and flows out from the destination node 302. The traffic L is ingress traffic flowing in from the source node 301 and destined for the destination node 302. The source node 301 obtains a traffic bandwidth t301302 (briefly referred to as t12 below) required for sending the traffic L, and a bandwidth A301302 (briefly referred to as A12 below) of a fabric side link between the source node 301 and the destination node 302. The traffic bandwidth t12 required by the traffic L is a total line bandwidth that needs to be occupied when the traffic L is sent from the source node 301 to the destination node 302, that is, a bandwidth occupied when the traffic L flows into the source node 301. When the source node 301 determines that t12 is greater than A12, S402 continues to be performed.

S402. The source node i sends a part of the ingress traffic on a direct path between the source node i and the destination node j, and sends the other part of the ingress traffic on at least one forwarding path to the destination node j through an intermediate node.

When determining that t12 is greater than A12, the source node 301 determines that the entire traffic L cannot be transmitted, without blocking, only on a direct path (link) between the source node 301 and the destination node 302. In this case, the source node 301 may divide the traffic L into two parts: L1 and L2, where L1 is still sent on the path 301→302, and L2 is sent to the destination node 302 through at least one intermediate node 303 or 304. That is, L2 may be sent to the destination node 302 on a path 301→303→302 or 301→304→302. In this case, the direct path 301→302 is a first transmission path, the path 301→303→302 or 301→304→302 is a second transmission path, and the node 303 or 304 is a first intermediate node. It should be noted that values of L1 and L2 may be specifically determined based on a requirement. For example, the source node 301 may determine the values of L1 and L2 based on preset proportions (for example, 50% and 50% of the traffic L respectively). For another example, the source node 301 may alternatively determine the values of L1 and L2 according to a principle of preferentially using the direct path and then using another path for remaining overflow traffic. In this case, the value of L1 is equal to A12, and the value of L2 is equal to (t12−A12). In this way, load balancing can be implemented while a delay is considered. Alternatively, the source node 301 may determine the values of L1 and L2 according to another rule.

The source node 301 may alternatively divide the traffic L into three parts: L1, L2, and L3, where L1 is still sent on the path 301→302, and L2 and L3 are sent to the destination node 302 through the intermediate nodes 303 and 304 respectively. That is, L2 may be sent to the destination node 302 on the path 301→303→302, and L3 may be sent to the destination node 302 on the path 301→304→302. In this case, the path 301→302 is a first transmission path, the path 301→303→302 is a second transmission path, the node 303 is a first intermediate node, the path 301→304→302 is a third transmission path, and the node 304 is a second intermediate node. It should be noted that values of L1, L2, and L3 may be specifically determined based on a requirement. For example, the source node 301 may determine the values of L1, L2, and L3 based on preset proportions (for example, 50%, 25%, and 25% of the traffic L respectively). For another example, the source node 301 may alternatively determine the values of L1, L2, and L3 according to a principle of preferentially using the direct path and then using another path for remaining overflow traffic. In this case, the value of L1 is equal to A12, the value of L2 may be equal to, for example, (t12−A12)/2, and the value of L3 may be equal to, for example, (t12−A12)/2. Alternatively, the source node 301 may determine the values of L1, L2, and L3 according to another rule.

When the source node 301 determines that t12 is greater than A12, that the source node 301 divides the traffic L into three parts, the value of L1 is equal to A12, and the values of L2 and L3 are both equal to (t12−A12)/2 is used as an example. In this case, for example, a packet 1 included in the traffic L may be sent to the destination node 302 on the path 301→302, a packet 2 included in the traffic L is sent to the destination node 302 on the path 301→303→302, and a packet 3 included in the traffic L is sent to the destination node 302 on the path 301→304→302. In this way, traffic is load balanced.

In some other possible cases, the traffic L may alternatively be divided into more parts, to be separately sent on different paths. When the traffic L is divided into a plurality of parts for sending, one or more parts may be sent by the source node to the destination node on a path including one or more (for example, two) intermediate nodes.

Figure 4B:
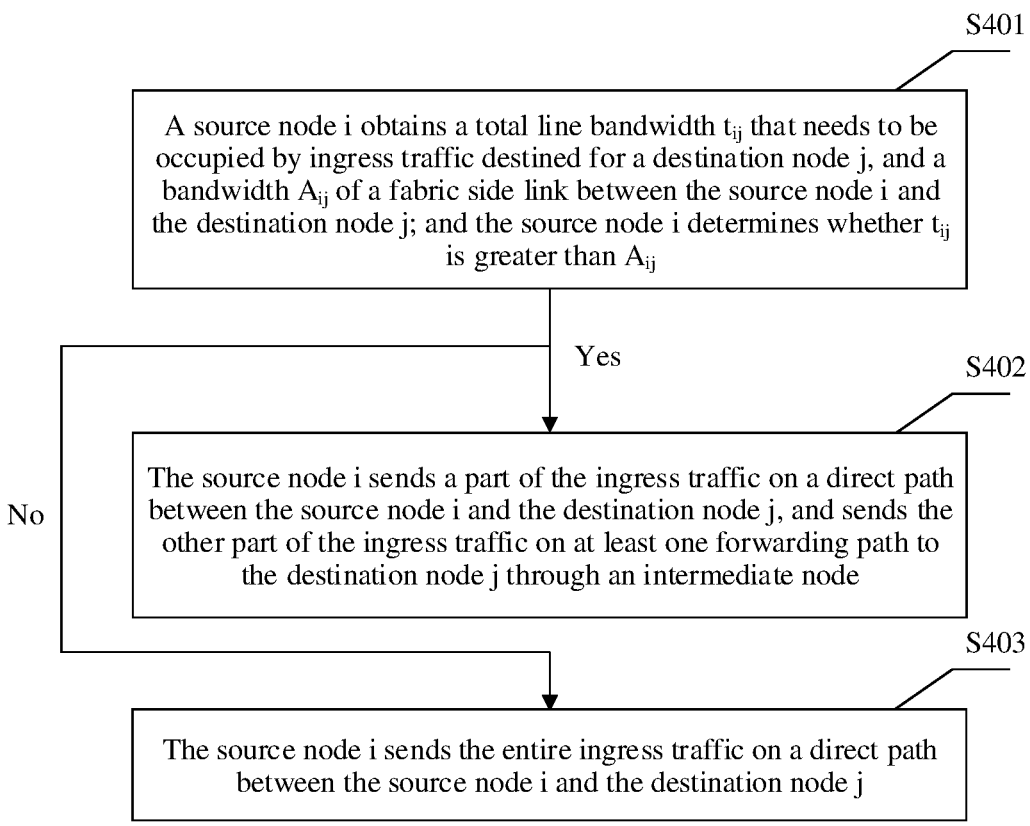
FIG. 4b is a schematic diagram of another method for load balancing according to an embodiment of this application.

Optionally, as shown in FIG. 4b, the method for load balancing may further include the following step.

S403. The source node i determines that $t_{ij}$ is less than or equal to $A_{ij}$, and the source node i sends the entire ingress traffic on the direct path between the source node i and the destination node j.

ered and a network switching capability is ensured. In addition, when the total line bandwidth that needs to be occupied when the traffic flows into the source node is not greater than the bandwidth of the fabric side link between the source node and the destination node, the source node may preferentially use the direct link to send the traffic to the destination node, thereby ensuring that the traffic is sent to the destination node with a short delay.

This embodiment of this application further provides a possible traffic sending path table. The traffic sending path table may be, for example, pre-stored in the source node, or may be stored in another storage location independent of the source node, so that the source node can obtain and determine a corresponding forwarding policy. For example, when t2≥A12, the source node 301 divides the traffic L into three parts L1, L2, and L3, where the value of L1 is equal to A12, and the values of L2 and L3 are both equal to (t12−A12)/2. A sending path table used when the traffic flows in from the source node 301 may be shown in Table 1.

TABLE 1

| Destination node | Result of comparison between a traffic bandwidth and a fabric side link bandwidth | Selection of a traffic path | Bandwidth occupied by traffic transmitted along the path |
| --- | --- | --- | --- |
| 301 | The source node is the same as the destination node, the traffic does not pass on a fabric side link, and load balancing is not required. | | |
| 302 | t12 ≤ A12 | 301 -> 302 | t12 |
|  | t12 > A12 | 301 -> 302 | A12 |
|  |  | 301 -> 303 -> 302 | (t12 − A12)/2 |
|  |  | 301 -> 304 -> 302 | (t12 − A12)/2 |
| 303 | t13 ≤ A13 | 301 -> 303 | t13 |
|  | t13 > A13 | 301 -> 303 | A13 |
|  |  | 301 -> 302 -> 303 | (t13 − A13)/2 |
|  |  | 301 -> 304 -> 303 | (t13 − A13)/2 |
| 304 | t14 ≤ A14 | 301 -> 304 | t14 |
|  | t14 > A14 | 301 -> 304 | A14 |
|  |  | 301 -> 302 -> 304 | (t14 − A14)/2 |
|  |  | 301 -> 303 -> 304 | (t14 − A14)/2 |

When determining that t12 is less than or equal to A12, the source node 301 determines that the entire traffic L can be transmitted, without blocking, only on the direct path (link) between the source node 301 and the destination node 302. Therefore, the source node 301 determines that the entire traffic L can be sent by using a shortest path solution in this case, to ensure that the traffic L is transmitted to the destination node 302 with a small delay. In this case, all of the three packets 1 to 3 included in the traffic L are sent to the destination node 302 on the path 301→302.

According to the method for load balancing provided in this embodiment of this application, because the source node may use different load balancing solutions for traffic of different volumes, flexibility of forwarding the traffic is improved. When the total line bandwidth that needs to be occupied when the traffic flows into the source node is greater than the bandwidth of the fabric side link between the source node and the destination node, the source node may choose to preferentially use the direct link to send the traffic to the destination node, and may send, to the destination node on another path passing through an intermediate node, overflow traffic that cannot be borne by the direct link. In this way, because the source node is allowed to forward traffic on a plurality of paths, a bandwidth of a fabric side link between the source node and any other node may be designed to be less than a line bandwidth of the source node, non-blocking switching of traffic is implemented at lower link bandwidth costs while a delay requirement is consid- It should be noted that sizes of bandwidths occupied by traffic forwarded along different paths are specified in Table 1, for example, a size of the traffic sent by the source node 301 along the path 301→304→302 to the destination node 302 is (t12-A12)/2. However, because the traffic is generally formed by a plurality of packets, and lengths of different packets may be different, during actual application, an error may be allowed for the volume of the traffic sent by the source node 301 along the path 301→304→302 to the destination node 302, that is, the volume of the traffic is not strictly equal to (t12−A12)/2. In addition, the source node 301 may determine a traffic segmentation granularity based on either of a packet quantity or a packet length, where the packet length includes a byte length of a packet and a unit quantity of the packet. Assuming t12=3A12, according to Table 1, the traffic sent from the source node 301 to the destination node 302 needs to be forwarded along the first transmission path 301→302, the second transmission path 301→303→302, and the third transmission path 301→304→302 separately. In addition, it may be calculated that a ratio of traffic forwarded along the first transmission path, the second transmission path, and the third transmission path is 1:1:1. It is assumed that the source node 301 receives six packets within a period of time. For example, if sizes of the six packets are approximately the same, a traffic segmentation granularity may be determined based on a quantity of packets. In this case, in the six packets received by the source node 301, two packets are forwarded along the first transmission path, two packets are forwarded along the second transmission path, and two packets are forwarded along the third transmission path. For example, if the traffic segmentation granularity is determined based on a byte length of a packet, and lengths of bytes included in the six packets received by the source node 301 in sequence are 100 bytes, 500 bytes, 200 bytes, 400 bytes, 300 bytes, and 300 bytes, it may be determined that the two packets with the 100-byte length and the 500-byte length are forwarded along the first transmission path, the two packets with the 200-byte length and the 400-byte length are forwarded along the second transmission path, and the two packets with the 300-byte length are forwarded along the third transmission path. After a packet enters a device chip, the packet may be divided into units with a fixed length in the chip for processing. For example, a length of the unit may be 128 bytes. When the packet is to be segmented, if a length of the packet is less than 128 bytes, padding is performed to reach 128 bytes (for example, zeros are padded); or if the length of the packet exceeds 128 bytes, 128 bytes may be intercepted as a unit. For example, if the traffic segmentation granularity is determined based on a quantity of packet units, and quantities of units included in the six packets received by the source node in sequence are 1, 5, 2, 4, 3, and 3, it may be determined that the two packets separately including one packet unit and five packet units are forwarded along the first transmission path, the two packets separately including two units and four units are forwarded along the second transmission path, and the two packets separately including three units are forwarded along the third transmission path. It should be noted that packets transmitted along a transmission path may be continuous, or may be discontinuous. This may be specifically determined according to an actual application scenario, or may be obtained through calculation based on a requirement.

According to the method for load balancing shown in FIG. 4a and FIG. 4b, the source node needs to determine, based on indicators such as the destination node to which the traffic needs to be sent, the total line bandwidth that the traffic needs to occupy, and the bandwidth of the fabric side link between the source node and the destination node, transmission paths separately corresponding to a plurality of packets forming the traffic. For each of the plurality of packets, the source node may specify a transmission path of each packet by using a method shown in FIG. 5a.

S501. A source node determines a destination node of a packet.

For example, the traffic L needs to be sent from the source node 301 to the destination node 302, and the traffic L includes at least three packets: a packet 1, a packet 2, and a packet 3. In S501, the source node 301 determines that a destination node of packets 1 to 3 is the node 302.

S502. The source node determines whether the destination node is consistent with the source node; and if yes, performs S503; otherwise, performs S504.

The source node 301 determines that the destination node 302 is inconsistent with the source node 301, and performs S504.

S503. The source node sends the packet from a line port of the source node.

When determining that the source node 301 is the destination node, the source node 301 directly sends the packet to a line egress of the source node 301.

S504. The source node determines a path for transmitting the packet.

The source node 301 separately determines paths used to send the packet 1, the packet 2, and the packet 3. For example, if the source node 301 finds that the total line bandwidth occupied by the traffic L exceeds the bandwidth of the link between the source node 301 and the destination node 302, the source node 301 determines, by querying Table 1, that load balancing needs to be performed on the traffic L along three transmission paths, and that the packet 1 is forwarded on the first transmission path 301→302, the packet 2 is forwarded on the second transmission path 301→303→302, and the packet 3 is forwarded on the third transmission path 301→304→302.

S505. The source node determines indication information of the path corresponding to the packet.

In a possible case, the source node determines, through addition, the indication information of the path corresponding to the packet. For example, the source node 301 may include forwarding path indication information in the packet 2 and the packet 3. The packet 2 is used as an example. The indication information may be used for each hop of node on the second transmission path, and may specifically include node identifiers of intermediate nodes and the destination node in sequence according to a forwarding sequence of the packet 2 on the second forwarding path. Alternatively, the indication information may further include a node identifier of the source node, to identify information about a source node sending a packet. Alternatively, the indication information may include only node information of an intermediate node, and does not include node information of the source node and the destination node. It may be understood that the source node that receives the packet may obtain related information of the source node and/or the destination node from information about an original packet for subsequent packet forwarding. The original packet is a packet that is received by the source node from the line port and that has not been processed by the source node, where the related information of the source node and the destination node may be obtained, for example, from a packet header of the original packet. For the packet 1, to ensure operation consistency, the source node 301 may alternatively determine, through addition, indication information of the first transmission path corresponding to the packet 1. The indication information may specifically include node identifiers of the source node and the destination node, or include only a node identifier of the destination node.

The node identifier is used to uniquely identify a node, and a specific form of the node identifier may be, for example, an internet protocol (IP) address or a media access control (MAC) address corresponding to an egress port of the node, may be a corresponding sequence number obtained by mapping an IP address of an egress port of the node, or may be another type of information that can uniquely identify a node. The destination node 302 of the packet 1 is used as an example. An IP address of an egress port of the destination node 302 may be, for example, XX.XX.302.XX (indicating a line egress for sending the packet to the node 302), or may be sequence number information corresponding to an IP address, for example, 302, of the destination node 302.

In some embodiments, the IP address is an IPv4 address or an IPv6 address.

In another possible case, the source node does not need to additionally include indication information, but directly uses indication information (information 511 shown in FIG. 5b) in an original packet. For example, because the packet 1 does not need to be transmitted through an intermediate node, the source node 301 may directly send the packet 1 to the destination node 302 based on destination node information in the original packet.

For the foregoing first case, the source node 301 may encapsulate the path indication information in the packet header of the packet. For example, the source node 301 encapsulates node identifiers of the intermediate node 303 and the destination node 302 on the second transmission path into a packet header of the packet 2 in a form of a label stack, for example, information 512 shown in FIG. 5b.

S506. The source node sends the packet to a next-hop node of the source node on the path based on the indication information of the path.

For example, the source node 301 sends the packet 2 from a fabric port of the node 301 to the intermediate node 303 on the second transmission path based on the information 512 in the packet.

If the path determined in S504 includes an intermediate node, the source node sends, in S506, the packet encapsulated with the indication information to a next-hop intermediate node on the path. For a case in which the path determined in S504 does not include an intermediate node, that is, a next hop is the destination node, the source node sends, in S506, the packet encapsulated with the indication information to the destination node. The intermediate node or the destination node that receives the packet including the indication information sent by the source node may receive and/or continue to forward a packet based on the indication information. For example, a method shown in FIG. 6 may be used.

S601. A current node receives a packet sent by a previous node.

That the intermediate node 303 receives the packet sent by the source node 301 is used as an example. Initial indication information included in the packet received by the intermediate node 303 may be, for example, information 611 shown in FIG. 6.

S602. The current node determines, based on indication information in the packet, whether the current node is a destination node of the packet; and if the current node is a destination node of the packet, performs S603; otherwise, performs S604.

If the current node is the destination node, when the destination node finds, when receiving the packet, that a node identifier in the indication information is the destination node itself, regardless of whether the indication information is in an information part (for example, the information 512) included by the source node or in an original packet (for example, the information 511), the current node determines that the current node is the destination node of the packet, and performs S603. It should be noted that, when the indication information sent by the source node further includes information about the source node, the destination node may find that the indication information further includes a node identifier of the source node.

If the current node is an intermediate node, when the intermediate node finds, when receiving the packet, that the intermediate node is not the destination node of the packet, S604 is performed. For example, the finding manner may be that a label stack used to carry the indication information includes more than two node identifiers, or that an indication value used to indicate a quantity of node identifiers still included in a label stack is not 1. Alternatively, another determining manner may be used. This is not uniquely limited herein. For example, the intermediate node 303 may determine, based on the indication information in the received packet, that the intermediate node 303 is not the destination node of the packet.

S603. The current node sends the packet to a line egress of the current node.

The current node serving as the destination node directly sends the packet to the line egress of the destination node.

S604. The current node processes the indication information, and sends the packet including processed indication information to a next-hop node.

For example, the intermediate node 303 may remove (where a length of a field used to store node identifiers becomes shorter) or erase (where a length of a field used to store node identifiers remains unchanged, but information corresponding to the $1^{st}$ node identifier in the label stack is empty) the $1^{st}$ node identifier from a label stack in a packet header of the packet. Alternatively, the node identifier field in the label stack is not modified, but an indication field is additionally set to indicate a quantity of valid node identifiers in the node identifier field. In this case, the intermediate node 303 only needs to modify a value of the indication field. After processing the indication information, the intermediate node 303 generates the processed indication information (the information 611 shown in FIG. 6), and then sends the packet to a next node on the second transmission path, that is, the destination node 302, on a fabric side link.

Figure 5A:
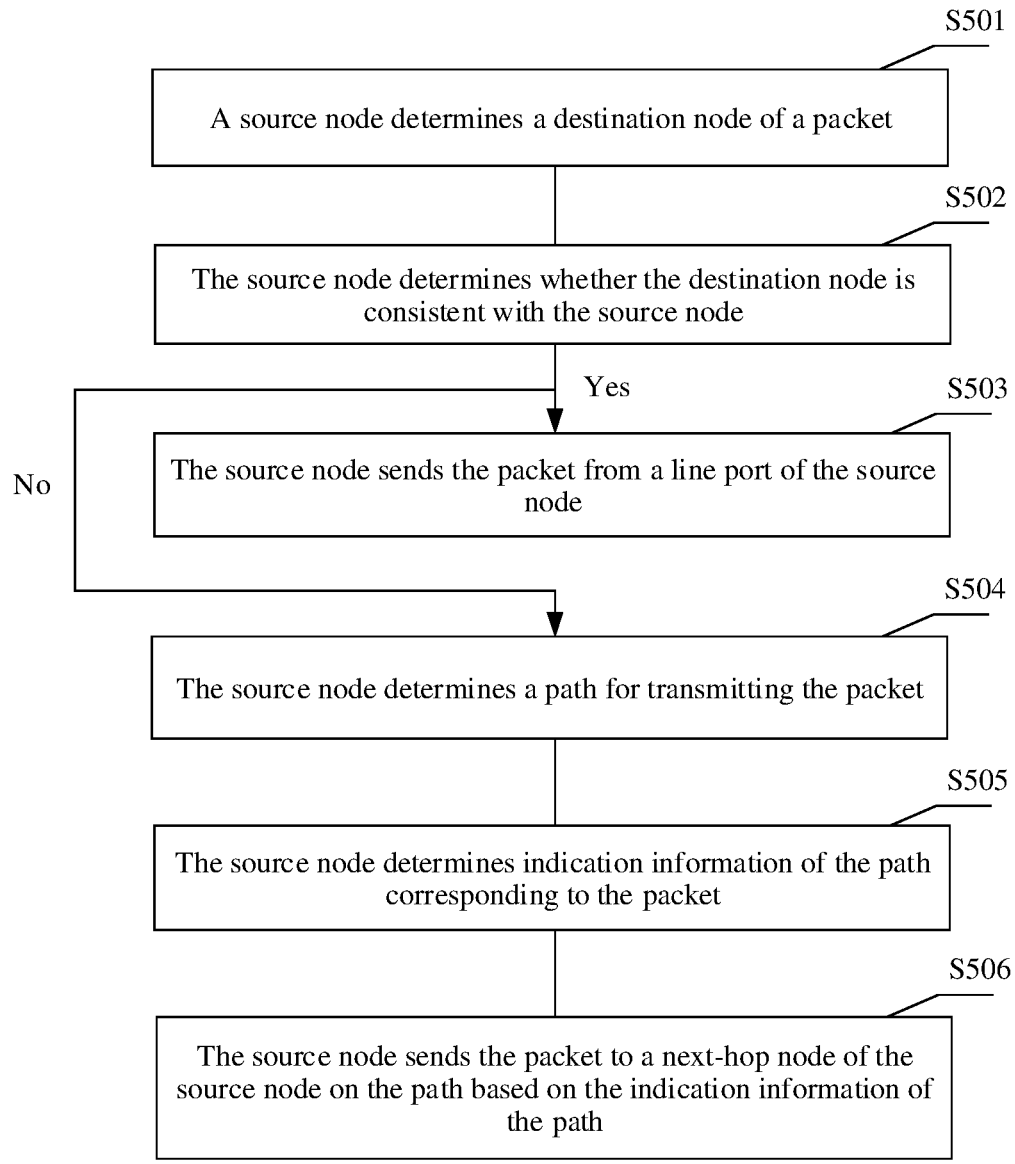
FIG. 5a is a schematic diagram of a packet processing method according to an embodiment of this application.
Figure 5B:
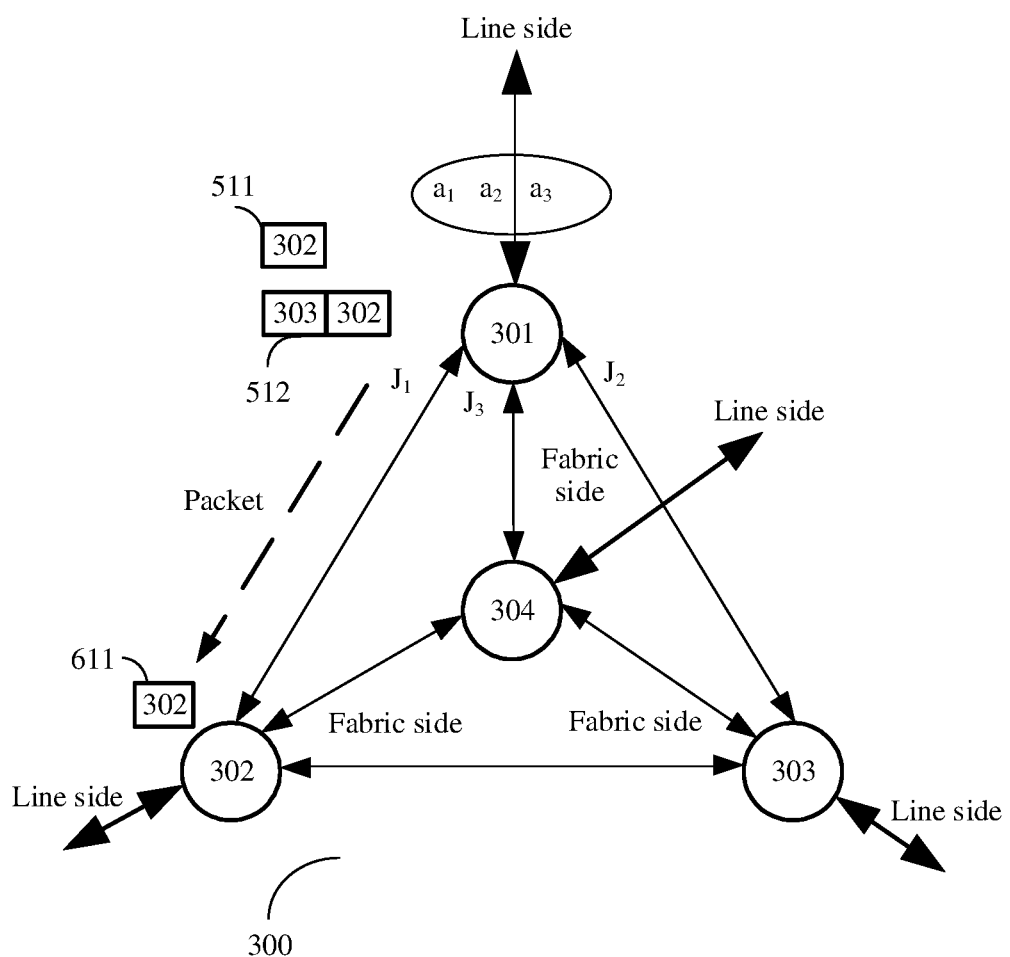
FIG. 5b is a schematic diagram of a packet processing method according to an embodiment of this application.
Figure 6:
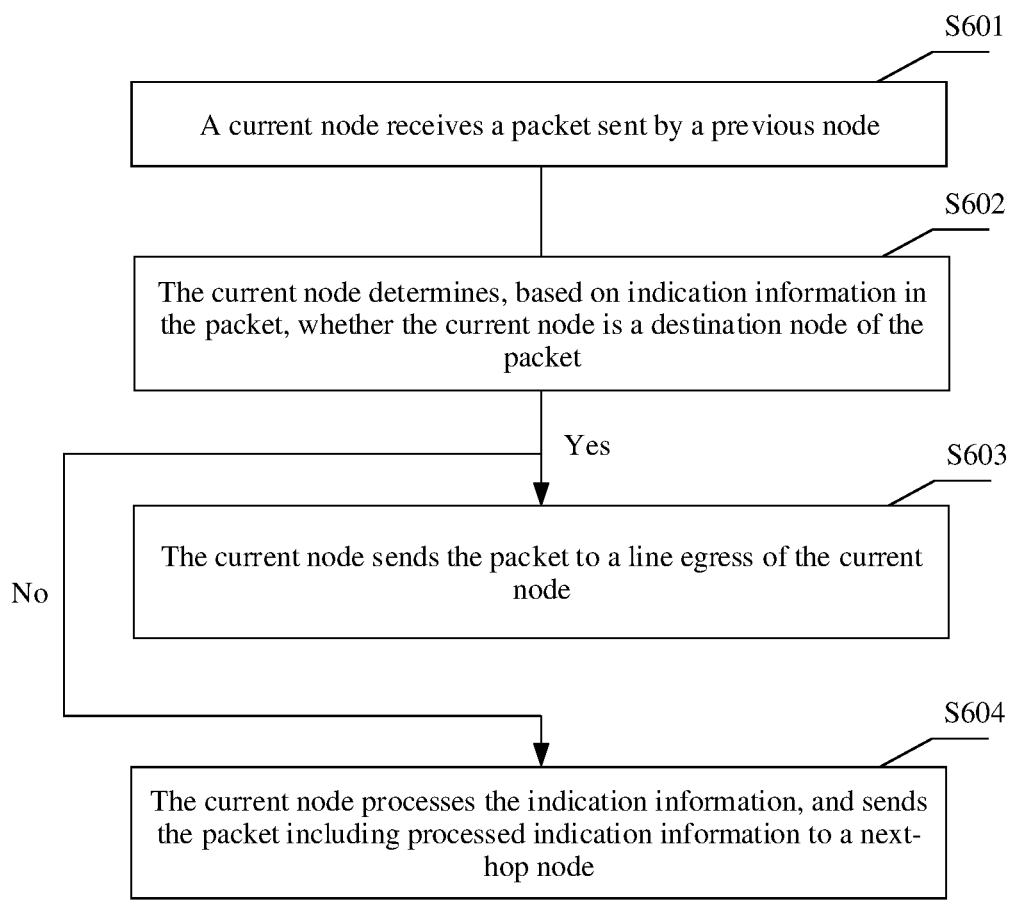
FIG. 6 is a schematic diagram of another packet processing method according to an embodiment of this application.

According to the methods shown in FIG. 5a, FIG. 5b, and FIG. 6, the traffic can be successfully sent from the source node to the destination node on a specified path.

Figure 7:
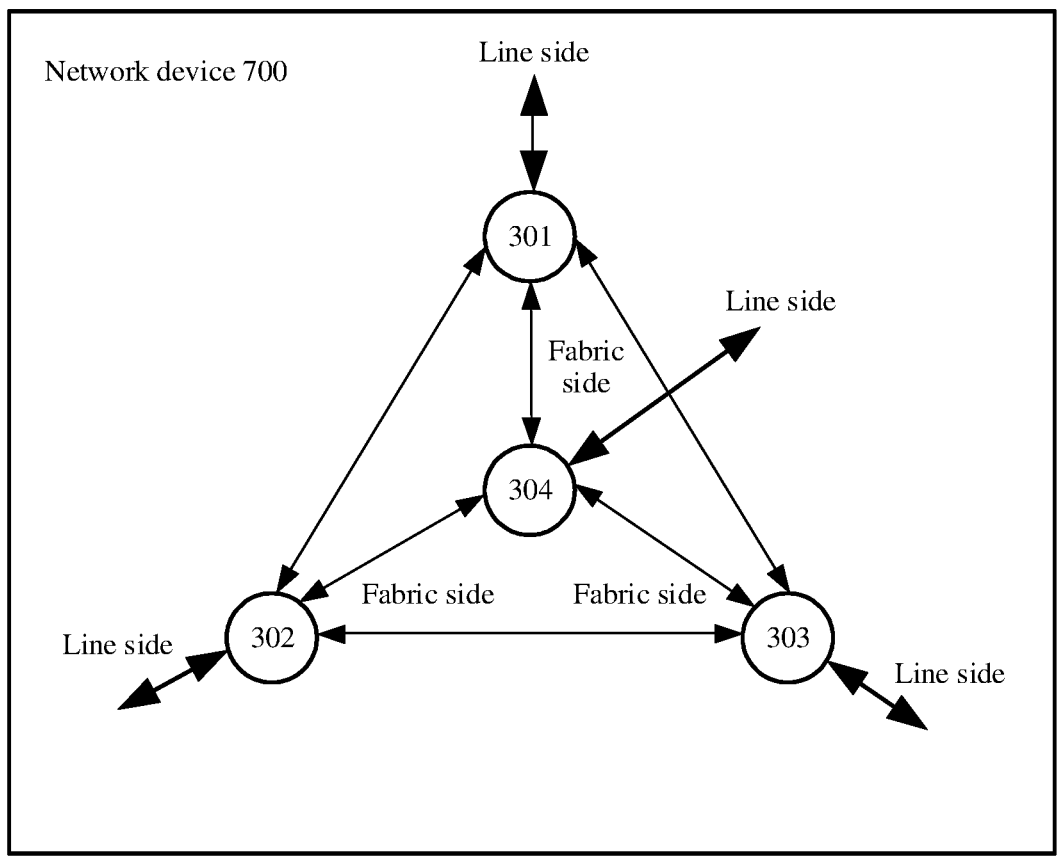
FIG. 7 is a schematic diagram of a structure of a network device according to an embodiment of this application.

In a possible application scenario of the foregoing method embodiments, the method may be applied to a network device 700 shown in FIG. 7. The network device 700 includes four nodes in total: a node 301, a node 302, a node 303, and a node 304. Each node is connected to the other three nodes, and the four nodes form a 4-node network structure. In other words, the four nodes that form the network structure are all located in a same network device 700. The node 301, the node 302, the node 303, and the node 304 each include a line port, which is configured to connect to a line port of another external network device. The node 301, the node 302, the node 303, and the node 304 each further include at least three groups of fabric ports, and the three groups of fabric ports of each node are separately configured to connect to the other three nodes, to implement fabric interconnection between the four nodes, thereby forming a full-mesh structure between the four nodes. In an actual application scenario, the network device 700 may be specifically a network switching device, for example, a network device having a packet forwarding function, such as a router or a switch. The nodes 301 to 304 may be basic dicing units integrated in the network device 700, for example, dies, and may be specifically located on one or more switching chips. Alternatively, the network device 700 may be specifically a switching board in a device. The switching board includes one or more switching chips, and the four nodes are located on the one or more switching chips.

When any two nodes are bidirectionally interconnected, bidirectional link bandwidths for interconnection between the any two nodes may or may not be equal, and line bandwidths of the nodes may or may not be equal. Corresponding designs may be implemented based on specific requirements of the network device.

In a case, the node 301, the node 302, the node 303, and the node 304 may be packaged in one switching chip in the network device 700. In another case, the node 301, the node 302, the node 303, and the node 304 may be alternatively packaged in two switching chips in the network device 700. Each switching chip may include two nodes; or one switching chip includes one node, and the other switching chip includes three nodes. In still another case, the node 301, the node 302, the node 303, and the node 304 may be alternatively packaged in three switching chips in the network device 700. Two switching chips each include one node, and the other switching chip includes two nodes. In yet another case, the node 301, the node 302, the node 303, and the node 304 may be alternatively packaged in four switching chips in the network device 700. Each switching chip includes only one node.

For a piece of traffic, any node in the network device 700 may be used as a source node of the traffic, and any node may be used as a destination node of the traffic. In a case, the source node and the destination node may be a same node. For example, a source node of traffic L is the node 301, and a destination node of the traffic L is the node 302. The source node 301 and the destination node 302 may separately perform functions performed by corresponding nodes described in the foregoing method embodiments, and achieve corresponding technical effects, as shown in FIG. 4*a* to FIG. 6. Details are not described herein again.

Figure 8:
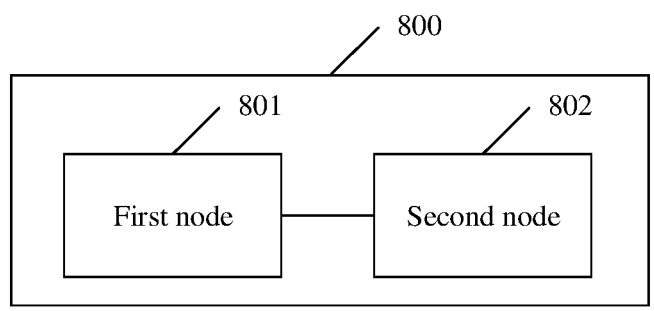
FIG. 8 is a schematic diagram of a structure of another network device according to an embodiment of this application.

An embodiment of this application further provides a network device 800, as shown in FIG. 8. The network device 800 may be specifically a network switching device, for example, a network device having a packet forwarding function, such as a router or a switch, or may be a switching board in a device. The switching board may include one or more switching chips. The network device 800 includes a first node 801 and a second node 802. The first node 801 and the second node 802 may be basic dicing units integrated in the network device 800, for example, dies, and may be specifically located on one or more switching chips.

The first node 801 is configured to receive a first packet and a second packet, where the first packet and the second packet belong to traffic flowing from the first node 801 to the second node 802 in the network device 800, and the traffic is ingress traffic flowing in from the first node 801 and destined for the second node 802. The first node 801 is a source node, and the second node 802 is a destination node. When a bandwidth occupied by the ingress traffic (that is, a total line bandwidth occupied by the ingress traffic) is greater than a bandwidth of a fabric side link between the first node and the second node, the first node transmits a first packet on a first transmission path, and transmits a second packet on a second transmission path. The first transmission path is a link that directly connects the first node and the second node, the second transmission path is a link that passes through a first intermediate node and that is from the first node to the second node, and the first intermediate node is also located in the network device 800, and may be specifically a die integrated in the network device 800.

In a specific implementation, the ingress traffic further includes a third packet. When the bandwidth occupied by the ingress traffic is greater than the bandwidth of the fabric side link between the first node and the second node, the first node further transmits the third packet on a third transmission path. The third transmission path is a link that passes through a second intermediate node and that is from the first node to the second node. The second intermediate node is also located in the network device 800, and may be specifically a die integrated in the network device 800.

In a possible implementation, the ingress traffic includes first traffic and second traffic, the first traffic includes the first packet, and the second traffic includes the second packet. The first node transmits the first traffic on the first transmission path, where a volume of the first traffic is the bandwidth of the fabric side link between the first node and the second node. The first node transmits the second traffic on the second transmission path, where a volume of the second traffic is a difference between the bandwidth occupied when the ingress traffic flows into the source node and the bandwidth of the fabric side link between the first node and the second node.

In a specific implementation, the ingress traffic includes first traffic, second traffic, and third traffic, the first traffic includes the first packet, the second traffic includes the second packet, and the third traffic includes the third packet. The first node transmits the first traffic on the first transmission path, where a volume of the first traffic is the bandwidth of the fabric side link between the first node and the second node. The first node transmits the second traffic on the second transmission path, and transmits the third traffic on the third transmission path. In a case, a volume of the second traffic is equal to a volume of the third traffic. If the difference between the bandwidth occupied by the ingress traffic and the bandwidth of the fabric side link between the first node and the second node is D, the second traffic and the third traffic are respectively 50% of D. It may be understood that, in other cases, actual proportions of the second traffic and the third traffic in D may alternatively be set based on an actual scenario and requirement. For example, if bandwidths of links between the first node and the first intermediate node and between the first node and the second intermediate node are different, for example, the bandwidth of the link from the first node to the first intermediate node is less than the bandwidth of the link from the first node to the second intermediate node, the second traffic and the third traffic may alternatively be considered to be set to 40% and 60% of the difference D respectively. It should be noted that, the first traffic, the second traffic, or the third traffic may be continuous or may be discontinuous, provided that the volume of the traffic finally transmitted on the corresponding transmission path meets a specified value or proportion.

In a specific implementation, when the bandwidth occupied by the ingress traffic is less than or equal to the bandwidth of the fabric side link between the first node and the second node, the first node may transmit the ingress traffic on the first transmission path.

In a specific implementation, the first node encapsulates indication information used to indicate the first transmission path into the first packet, and encapsulates indication information used to indicate the second transmission path into the second packet.

In an example, the first node may be, for example, the node 301 shown in FIG. 3, and the second node may be, for example, the node 302 shown in FIG. 3. The node 301 is used as a source node of the traffic L, and the node 302 is used as a destination node of the traffic L. The source node 301 used as the first node and the destination node 302 used as the second node may be separately configured to implement functions performed by corresponding nodes in the foregoing method embodiments, and implement corresponding technical effects. Details are not described herein again. In this example, the second node may be the destination node 302 in the foregoing embodiments, the first intermediate node may be the node 303 in the foregoing embodiments, and the second intermediate node may be the node 304 in the foregoing embodiments.

Figure 9:
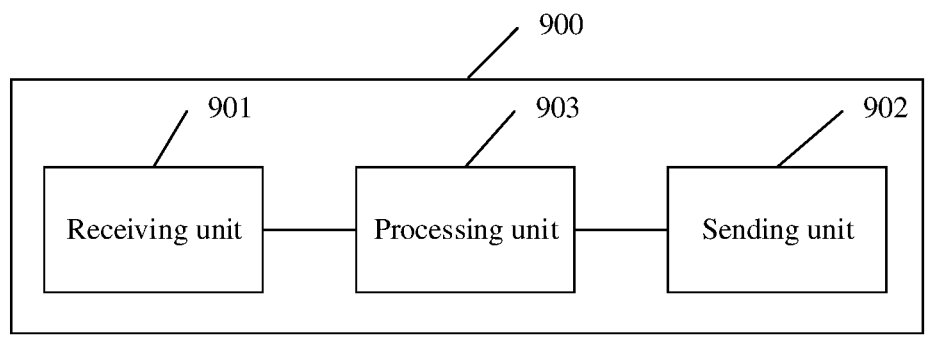
FIG. 9 is a schematic diagram of a structure of another network device according to an embodiment of this application.
Figure 10:
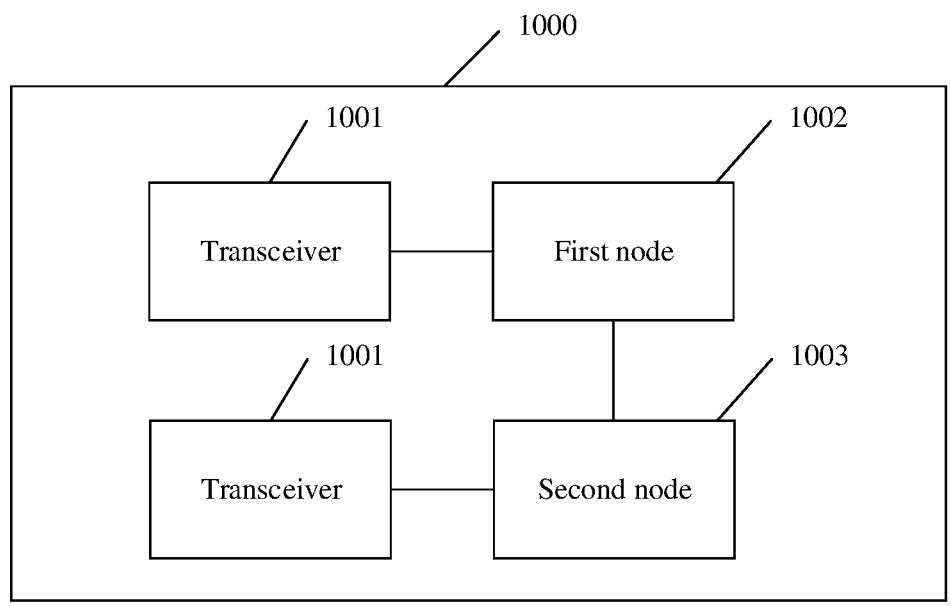
FIG. 10 is a schematic diagram of a structure of another network device according to an embodiment of this application.

FIG. 9 is a schematic diagram of a structure of another network device 900 according to an embodiment of this application. The network device 900 may be specifically a network switching device, for example, a network device having a packet forwarding function, such as a router or a switch, or may be a switching board. The switching board may include one or more switching chips. The network device 900 includes a receiving unit 901 and a sending unit 902. A first node is located in the network device 900.

The receiving unit 901 is configured to receive traffic flowing in from the first node, where the traffic is to be sent from the first node to a second node, the first node is a source node, the second node is a destination node, and the first node and the second node belong to a same 4-node network architecture. For example, the traffic may be transmitted from a line port of the network device 900 to a line port of the first node, to flow in from the first node. The traffic includes a first packet and a second packet.

The sending unit 902 is configured to: when a bandwidth occupied when the traffic flows in is greater than a bandwidth of a fabric side link between the first node and the second node, transmit the first packet from the first node on a first transmission path, and transmit the second packet from the first node on a second transmission path, where the first transmission path is a link that directly connects the first node and the second node, and the second transmission path is a link that passes through a first intermediate node and that is from the first node to the second node. That the sending unit 902 transmits a packet from the first node may be specifically sending the packet through a link side port of the first node. The first intermediate node, the first node, and the second node belong to the same 4-node network architecture.

In a specific implementation, the traffic further includes a third packet. When the bandwidth occupied by the traffic is greater than the bandwidth of the fabric side link between the first node and the second node, the sending unit 902 is further configured to transmit the third packet from the first node on a third transmission path, where the third transmission path is a link that passes through a second intermediate node and that is from the first node to the second node. The first intermediate node, the first node, the second node, and the first intermediate node belong to the same 4-node network architecture.

In a possible implementation, the traffic includes first traffic and second traffic, the first traffic includes the first packet, and the second traffic includes the second packet. The sending unit 902 transmits the first traffic on the first transmission path, where a volume of the first traffic is the bandwidth of the fabric side link between the first node and the second node. The sending unit 902 transmits the second traffic on the second transmission path, where a volume of the second traffic is a difference between the bandwidth occupied when the traffic flows into the source node and the bandwidth of the fabric side link between the first node and the second node.

In a specific implementation, the traffic includes first traffic, second traffic, and third traffic, the first traffic includes the first packet, the second traffic includes the second packet, and the third traffic includes the third packet. The sending unit 902 transmits the first traffic from the first node on the first transmission path, where a volume of the first traffic is the bandwidth of the fabric side link between the first node and the second node. The sending unit 902 transmits the second traffic from the first node on the second transmission path, and transmits the third traffic from the first node on the third transmission path. A volume of the second traffic is a first difference, and the first difference is a part of a difference between the bandwidth occupied by the traffic and the bandwidth of the fabric side link between the source node and the destination node. A volume of the third traffic is a second difference, and the second difference is the other part of the difference between the bandwidth occupied by the traffic and the bandwidth of the fabric side link between the source node and the destination node. In a case, the volume of the second traffic is equal to the volume of the third traffic. In another case, alternatively, allocation proportions of the second traffic and the third traffic may be specifically set based on a requirement. In other cases, allocation proportions of the first traffic, the second traffic, and the third traffic may all be set according to an actual situation.

In a specific implementation, when the bandwidth occupied by the traffic is less than or equal to the bandwidth of the fabric side link between the first node and the second node, the sending unit 902 may transmit the traffic from the first node only on the first transmission path.

In a specific implementation, the network device further includes a processing unit 903. The processing unit 903 may encapsulate indication information used to indicate the first transmission path into the first packet, and encapsulate indication information used to indicate the second transmission path into the second packet, and/or encapsulate indication information used to indicate the third transmission path into the third packet. In this way, after traffic to a same destination node enters the network device, the network device performs load balancing calculation only once, and then the network device separately encapsulates the determined path indication information into corresponding packets, to indicate the encapsulated packets to be separately forwarded in a network based on the indication information.

In an example, the first node may be, for example, the node 301 shown in FIG. 3, where the node 301 is used as the source node of the traffic. The network device 900 including the source node 301 serving as the first node may implement, at the source node 301, corresponding functions in the foregoing method embodiments, and implement corresponding technical effects. Details are not described herein again. In this example, the second node may be the destination node 302 in the foregoing embodiments, the first intermediate node may be the node 303 in the foregoing embodiments, and the second intermediate node may be the node 304 in the foregoing embodiments.

An embodiment of this application further provides a network device 1000. The network device 1000 includes a transceiver 1001 and a first node 1002. For example, the first node 1002 may be the node 301 shown in FIG. 3. The transceiver 1001 of the network device 1000 is configured to receive traffic, and send the traffic to the first node. The network device 1000 may perform, at the node (or the source node) 301, corresponding methods and functions described in the foregoing method embodiments of this application. For example, the traffic is sent by the first node 1002 to a second node 1003. The first node 1002 and the second node 1003 belong to a same 4-node network structure, the first node 1002 is a source node, the second node 1003 is a destination node, and the traffic includes a first packet and a second packet. When a bandwidth occupied when the traffic flows into the first node 1002 is greater than a bandwidth of a fabric side link between the first node 1002 and the second node 1003, the first node 1002 is configured to transmit the first packet on a first transmission path, and transmit the second packet on a second transmission path, where the first transmission path is a path that directly connects the first node 1002 and the second node 1003, the second transmission path is a path that passes through a first intermediate node (for example, the node 303) and that is from the first node 1002 to the second node 1003, and the first intermediate node belongs to the 4-node network structure. For other functions that may be performed by the first node 1002 as a source node (for example, the source node 301), refer to related descriptions in the foregoing method embodiments. Details are not described herein again.

There may be a plurality of transceivers 1001, to receive different traffic. The different traffic may be distinguished according to a service type, a user, or the like. The second node 1003 may be located in the network device 1000 (the case shown in FIG. 1), or may be located in another network device in a network. When the second node 1003 is located in the network device 1000, the second node 1003 is further configured to receive the first packet and the second packet. The network device 1000 may process the first packet and the second packet that are received by the second node 1003. The processing may be packet forwarding, packet storage, or the like.

An embodiment of this application further provides a chip 1100. The chip 1100 includes a first node 1101, the first node belongs to a 4-node network structure, and the first node may be, for example, the foregoing source node 301. The first node is configured to send traffic to a second node 1102. The first node 1101 is a source node, the second node 1102 is a destination node (for example, the foregoing destination node 302), and the first node 1101 and the second node 1102 belong to the same 4-node network structure. When a bandwidth occupied by the traffic is greater than a bandwidth of a fabric side link between the first node 1101 and the second node 1102, the first node 1101 is configured to transmit the first packet in the traffic on a first transmission path, and transmit the second packet in the traffic on a second transmission path, where the first transmission path is a path that directly connects the first node 1101 and the second node 1102, the second transmission path is a path that passes through a first intermediate node 1103 (for example, refer to the foregoing node 303) and that is from the first node 1101 to the second node 1102, and the first intermediate node belongs to the 4-node network structure. The traffic may further include a third packet. The first node 1101 transmits the third packet on a third transmission path. The third transmission path is a path that passes through a second intermediate node 1104 (for example, refer to the foregoing node 304) and that is from the first node 1101 to the second node 1102. For other functions that may be performed by the first node 1101 as the source node, refer to related descriptions of a corresponding node (for example, the source node 301) in the foregoing method embodiments. Details are not described herein again.

Figure 11:
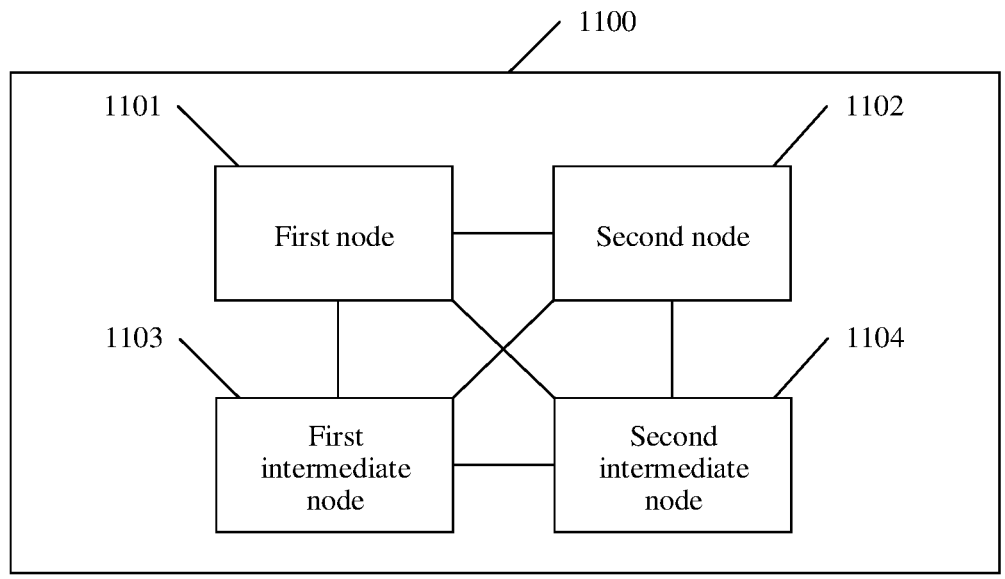
FIG. 11 is a schematic diagram of a structure of a chip according to an embodiment of this application.

It should be noted that, the second node 1102 and the first intermediate node and/or the second intermediate node may also belong to the chip 1100 (the case shown in FIG. 11), or may not belong to the chip 1100. That is, the four nodes that form the 4-node network structure may belong to a same chip 1100, or may belong to a plurality of different chips. When the four nodes belong to a same chip 1100, the chip 1100 may belong to one network device (for example, a router, a switch, or a switching board). When the four nodes belong to a plurality of different chips, the plurality of chips may be located in one network device, or may be located in a plurality of (that is, two or more) network devices. Because the chip allows traffic to be transmitted on at least two fabric side links between nodes, instead of being forwarded only on a direct fabric side link between the nodes, a fabric speedup of a node can be reduced to some extent, to save network resources.

Figure 12:
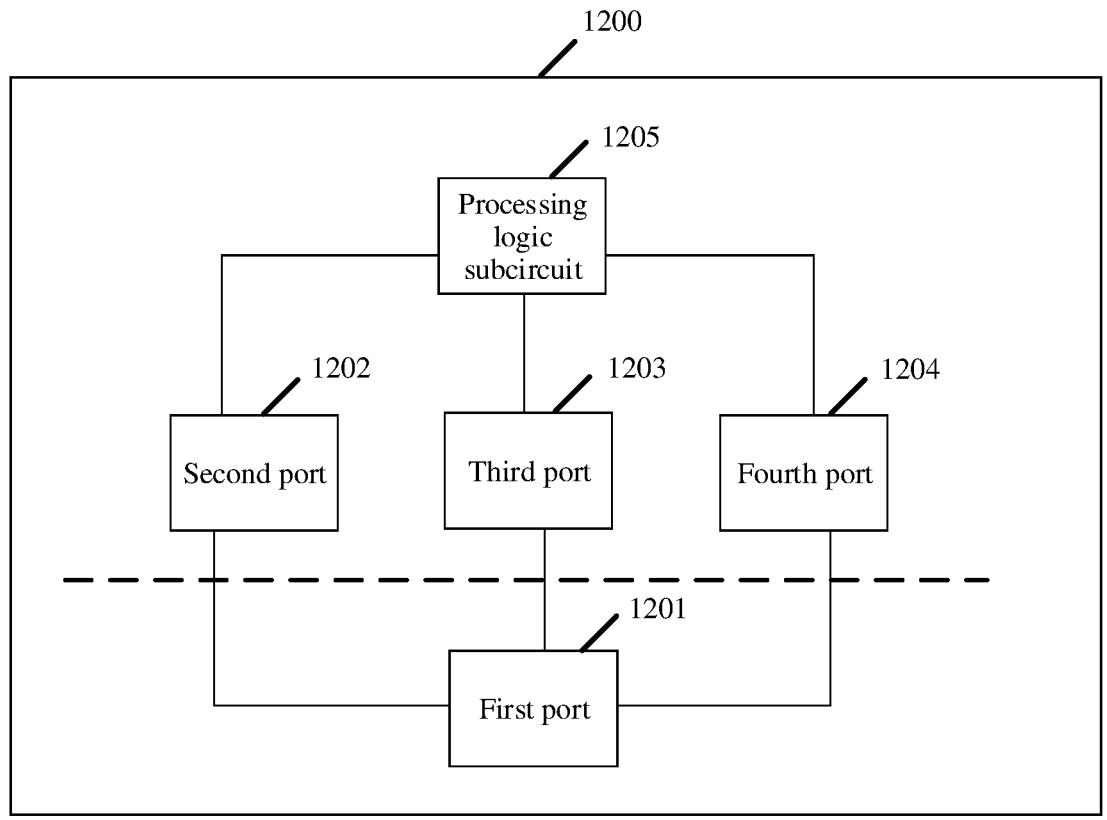
FIG. 12 is a schematic diagram of a structure of a circuit according to an embodiment of this application.

An embodiment of this application further provides a circuit 1200, as shown in FIG. 12. The circuit is configured to implement a function of a source node (for example, the foregoing source node 301), the source node is configured to transmit traffic to a destination node, and the source node and the destination node (for example, the foregoing destination node 302) belong to a 4-node network structure. The circuit includes a first port 1201, a second port 1202, and a third port 1203. The first port 1201 may be a line port, and is configured to connect to a line port of a device to which the circuit belongs. The second port 1202 and the third port 1203 may be fabric ports, and are configured to connect to the destination node and a first intermediate node (for example, the node 303) respectively, where the first intermediate node also belongs to the 4-node network structure. The first port 1201 is configured to receive the traffic. When a bandwidth occupied by the traffic flowing into the source node is greater than a bandwidth of a fabric side link between the source node and the destination node, the second port 1202 is configured to transmit a first packet in the traffic on a first transmission path, and the third port 1203 is configured to transmit a second packet in the traffic from the source node on a second transmission path. The first transmission path is a path that directly connects the source node and the destination node, and the second transmission path is a path that passes through the first intermediate node and that is from the source node to the destination node.

The circuit may further include a fourth port 1204. The fourth port 1204 may be a fabric port, configured to connect to a second intermediate node (for example, the node 304), and the second intermediate node also belongs to the 4-node network structure. The traffic further includes a third packet. When the bandwidth occupied when the traffic flows into the source node is greater than the bandwidth of the fabric side link between the source node and the destination node, the fourth port 1204 further transmits the third packet from the source node on a third transmission path, where the third transmission path is a path that passes through the second intermediate node and that is from the source node to the destination node.

When the bandwidth occupied when the traffic flows into the source node is less than or equal to the bandwidth of the fabric side link between the source node and the destination node, the circuit transmits the traffic on the first transmission path through the second port 1202.

The circuit may further include a processing logic subcircuit 1205. The processing logic subcircuit 1205 is configured to encapsulate indication information indicating the first transmission path into the first packet, and encapsulate indication information indicating the second transmission path into the second packet.

Figure 13:
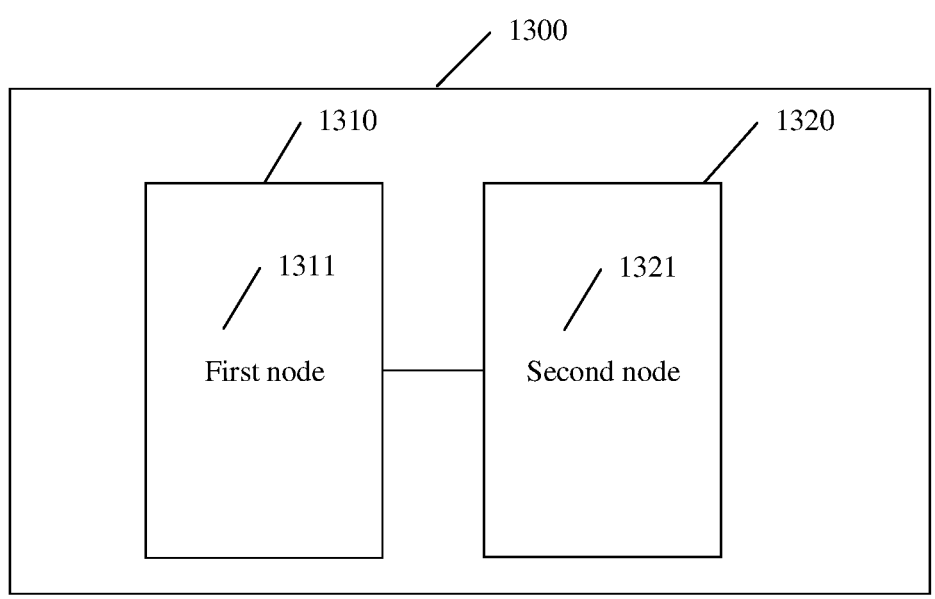
FIG. 13 is a schematic diagram of a structure of a network system according to an embodiment of this application.

FIG. 13 shows a network system 1300 according to an embodiment of this application. The network system 1300 includes one or more network devices. The one or more network devices include a first network device 1310 and a second network device 1320.

In a specific implementation, the first network device 1310 includes a first node 1311, and the second network device 1320 includes a second node 1321. The first node 1311 and the second node 1321 belong to a 4-node network structure. The other two nodes that form the 4-node network structure together with the first node and the second node are a third node and a fourth node respectively. One or both of the third node and the fourth node may be located in the first network device 1310, may be located in the second network device 1320, or may be located in another network device different from the first network device 1310 or the second network device 1320.

The first network device 1310 or the second network device 1320 may be a network switching device, for example, a network device having a packet forwarding function, such as a router or a switch, may be a switching board, or may be a switching chip. The first network device 1310 or the second network device 1320 may be network devices of a same type, for example, switching chips, or may be network devices of different types, for example, a combination of a router and a switching board. The four nodes forming the network structure may be dies.

When a packet that belongs to one piece of traffic is transmitted in the network system 1300 including the 4-node network architecture, the first network device 1310 may be used as an initial receiving device for the packet flowing into the network system 1300, and may also be referred to as a source network device. The first node 1311 included in the first network device 1310 may be the source node 301, the first node 801, the first node 1002, or the first node 1101 in the foregoing embodiments, and may implement a corresponding function of the circuit 1200. For functions that can be performed by the first node and effects achieved by the first node, refer to the foregoing corresponding embodiments. Details are not described herein again.

When the packet is sent from the first network device 1310 and continues to be transmitted in the network system 1300 including the 4-node network architecture, the second network device 1320 may be an intermediate network device receiving the packet. When the second network device 1320 is used as an intermediate device, the second network device 1320 may continue to forward the packet according to indication information in the packet. Alternatively, the second network device 1320 may be a destination network device receiving the packet. When the second network device 1320 is used as an intermediate device, the second node 1321 included in the second network device 1320 is an intermediate node, for example, may be the node 303 or the node 304 in the foregoing embodiments. When the second network device 1320 is used as a destination device, the second node 1321 included in the second network device 1320 is a destination node, for example, may be the node 302 in the foregoing embodiments. For functions that can be performed by the second node and effects achieved by the second node, refer to the foregoing corresponding embodiments. Details are not described herein again.

In another specific implementation, the first network device 1310 includes a receiving unit and a sending unit. The first network device 1310 may be, for example, the network device 900 shown in FIG. 9. In this case, the receiving unit included in the first network device 1310 is the receiving unit 901, and the sending unit included in the first network device 1310 is the sending unit 902, to implement a corresponding function performed by the network device 900 serving as the first network device 1310. The first node included in the first network device 1300 may be the node 301 shown in FIG. 3, or the source node 301 or the first node in the foregoing embodiments, so that the first network device 1300 performs, at the first node, a corresponding function in the method embodiments.

The second network device 1320 includes a receiving unit. The receiving unit of the second network device may be configured to receive, from the second node (for example, through a line port of the second node), a packet sent by the first network device 1310, where the packet includes path indication information determined by the first network device 1310. When the second network device 1320 is an intermediate device, the second network device 1320 further includes a sending unit. The sending unit is configured to send the packet to another network device from the second node (for example, through a link side port of the second node) based on the path indication information. In a case, when the second network device 1320 is a destination device, the second network device 1320 further includes a sending unit. In this case, the sending unit is configured to complete forwarding of the packet in the second network device 1320 at the second node based on the path indication information, specifically, for example, send the packet from the line port of the second node to a line port of the second network device 1320, so that the second network device 1320 locally stores or processes the packet. The second node included in the second network device 1320 may be the node 302, 303, or 304 in FIG. 3. The second node may alternatively be the destination node 302 in the foregoing embodiments, the node 303 or 304 serving as an intermediate forwarding node, or the first intermediate node or the second intermediate node in the foregoing embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, and shall not be understood as an indication or implication of relative importance. The term "at least one" means one or more, and the term "a plurality of" means two or more, unless expressly limited otherwise.

Different types of embodiments such as the method embodiments and the apparatus embodiments provided in embodiments of this application may be mutually referred to. This is not limited in embodiments of this application. A sequence of the operations of the method embodiment provided in embodiments of this application can be properly adjusted, and the operations can be correspondingly added or deleted based on a situation. Any method that can be easily figured out by a person skilled in the art without departing from a technical scope disclosed in this application shall fall within the protection scope of this application, and therefore details are not described again.

In the corresponding embodiments provided in this application, it should be understood that the disclosed system and device may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts described as units may or may not be physical units, may be located at one position, or may be distributed on a plurality of network devices (for example, terminal devices). Some or all of the units may be selected based on actual requirements to achieve the objectives of the solutions of embodiments.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining a traffic bandwidth occupied by ingress traffic flowing into a source node;
   determining that the traffic bandwidth is greater than a first transmission path bandwidth of a first transmission path; and
   in response to determining that the traffic bandwidth is greater than the first transmission path bandwidth, performing non-blocking transmission of a first packet and a second packet of the ingress traffic by:
      transmitting, by the source node, the first packet in the ingress traffic on the first transmission path; and
      transmitting the second packet in the ingress traffic on a second transmission path,
   wherein:
      the first transmission path comprises a fabric side link that directly connects the source node and a destination node,
      the second transmission path passes through a first intermediate node and is from the source node to the destination node,
      the source node, the destination node, and the first intermediate node are comprised in a 4-node network structure, and
      every two nodes in the 4-node network structure are interconnected.

2. The method according to claim 1, wherein the ingress traffic further comprises a third packet, and the method further comprises:
   when the traffic bandwidth occupied by the ingress traffic is greater than the first transmission path bandwidth of the fabric side link between the source node and the destination node, transmitting, by the source node, the third packet in the ingress traffic on a third transmission path, wherein the third transmission path passes through a second intermediate node and is from the source node to the destination node, and the second intermediate node belongs to the 4-node network structure.

3. The method according to claim 2, wherein the ingress traffic comprises first traffic, second traffic, and third traffic, the first traffic comprises the first packet, the second traffic comprises the second packet, and the third traffic comprises the third packet, and the method comprises:
   transmitting, by the source node, the first traffic on the first transmission path, wherein a volume of the first traffic is the first transmission path bandwidth of the fabric side link between the source node and the destination node;
   transmitting, by the source node, the second traffic on the second transmission path, wherein a volume of the second traffic is a first difference, and the first difference is a part of a difference between the traffic bandwidth occupied by the ingress traffic and the first transmission path bandwidth of the fabric side link between the source node and the destination node; and
   transmitting, by the source node, the third traffic on the third transmission path, wherein a volume of the third traffic is a second difference, and the second difference is another part of the difference between the traffic bandwidth occupied by the ingress traffic and the first transmission path bandwidth of the fabric side link between the source node and the destination node.

4. The method according to claim 3, wherein the first difference is equal to the second difference.

5. The method according to claim 1, wherein the ingress traffic comprises first traffic and second traffic, the first traffic comprises the first packet, and the second traffic comprises the second packet, and the method comprises:
   transmitting, by the source node, the first traffic on the first transmission path, wherein a volume of the first traffic is the first transmission path bandwidth of the fabric side link between the source node and the destination node; and
   transmitting, by the source node, the second traffic on the second transmission path, wherein a volume of the second traffic is a difference between the traffic bandwidth occupied by the ingress traffic and the first transmission path bandwidth of the fabric side link between the source node and the destination node.

6. The method according to claim 1, further comprising:
   when the traffic bandwidth occupied by the ingress traffic is less than or equal to the first transmission path bandwidth of the fabric side link between the source node and the destination node, transmitting, by the source node, the ingress traffic on the first transmission path.

7. The method according to claim 1, further comprising:
   encapsulating, by the source node, first indication information indicating the first transmission path into the first packet, and encapsulating second indication information indicating the second transmission path into the second packet.

8. The method according to claim 1, wherein the 4-node network structure is packaged in one or more chips.

9. A chip comprising circuitry implementing a first node, wherein the first node and a second node belong to a 4-node network structure, every two nodes in the 4-node network structure are interconnected, the first node is a source node, and the second node is a destination node;
   wherein the chip is configured to:
      determine a traffic bandwidth occupied by ingress traffic flowing into the source node; and
      determine that the traffic bandwidth is greater than a first transmission path bandwidth of a first transmission path;
   wherein the first node is configured to:
      in response the determination that the traffic bandwidth is greater than the first transmission path bandwidth, perform non-blocking transmission of a first packet and a second packet of the ingress traffic by:
         transmitting the first packet in the ingress traffic on the first transmission path; and transmitting the second packet in the ingress traffic on a second transmission path; and wherein:
the first transmission path comprises a fabric side link that directly connects the first node and the destination node,
the second transmission path passes through a first intermediate node and that is from the first node to the destination node, and
the first intermediate node belongs to the 4-node network structure.

10. The chip according to claim 9, wherein the chip is further configured in a manner that:
when the traffic bandwidth occupied by the ingress traffic is greater than the first transmission path bandwidth of the fabric side link between the first node and the second node, the first node further transmits a third packet in the ingress traffic on a third transmission path, wherein the third transmission path passes through a second intermediate node and is from the first node to the second node, and the second intermediate node belongs to the 4-node network structure.

11. The chip according to claim 9, wherein the chip is further configured in a manner that:
when the traffic bandwidth occupied by the ingress traffic is less than or equal to the first transmission path bandwidth of the fabric side link between the first node and the second node, the first node transmits the ingress traffic on the first transmission path.

12. The chip according to claim 9, wherein the chip is further configured in a manner that:
the first node encapsulates first indication information indicating the first transmission path into the first packet, and encapsulates second indication information indicating the second transmission path into the second packet.

13. The chip according to claim 9, further comprising circuitry implementing the second node.

14. A network system, comprising:
a first network device implementing a source node; and
a second network device implementing a destination node, wherein the source node and the destination node belong to a 4-node network structure, and every two nodes in the 4-node network structure are interconnected;
wherein the first network device is configured to:
determine a traffic bandwidth occupied by ingress traffic flowing into the source node;
determine that the traffic bandwidth is greater than a first transmission path bandwidth of a first transmission path; and
in response to determining that the traffic bandwidth is greater than the first transmission path bandwidth, perform non-blocking transmission of a first packet and a second packet of the ingress traffic by:

transmitting the first packet in the ingress traffic on the first transmission path determined by the source node, and
transmitting the second packet in the ingress traffic on a second transmission path determined by the source node; and wherein:
the first transmission path comprises a fabric side link that directly connects the source node and the destination node,
the second transmission path passes through a first intermediate node and is from the source node to the destination node, and
the first intermediate node belongs to the 4-node network structure; and
wherein the second network device is configured to receive the first packet and the second packet through the destination node.

15. The network system according to claim 14, wherein the ingress traffic further comprises a third packet; and
wherein the first network device is further configured to:
when the traffic bandwidth occupied by the ingress traffic is greater than the first transmission path bandwidth of the fabric side link between the source node and the destination node, transmit the third packet in the ingress traffic on a third transmission path determined by the source node, wherein the third transmission path passes through a second intermediate node and is from the source node to the destination node, and the second intermediate node belongs to the 4-node network structure.

16. The network system according to claim 14, wherein the first network device is further configured to:
when the traffic bandwidth occupied by the ingress traffic is less than or equal to the first transmission path bandwidth of the fabric side link between the source node and the destination node, transmit the ingress traffic on the first transmission path determined by the source node.

17. The network system according to claim 14, wherein the first network device is further configured to:
encapsulate, through the source node, first indication information indicating the first transmission path into the first packet, and encapsulate, through the source node, second indication information indicating the second transmission path into the second packet.

18. The network system according to claim 17, wherein the second network device is configured to process the first packet and the second packet based on the first indication information in the first packet and the second indication information in the second packet respectively.

19. The network system according to claim 14, wherein the source node is packaged in a first chip of the first network device, and the destination node is packaged in a second chip of the second network device.

* * * * *

UNITED STATES PATENT AND TRADEMARK OFFICE
CERTIFICATE OF CORRECTION

PATENT NO. : 11,824,781 B2
APPLICATION NO. : 17/858328
DATED : November 21, 2023
INVENTOR(S) : Zhao et al.

It is certified that error appears in the above-identified patent and that said Letters Patent is hereby corrected as shown below:

In the Claims

In Column 33, in Claim 9, Line 8, delete "that is" and insert -- is --.

In Column 33, in Claim 14, Lines 45-46, after "interconnected" delete ";" and insert -- , --.

Signed and Sealed this
Thirtieth Day of January, 2024

Katherine Kelly Vidal
*Director of the United States Patent and Trademark Office*